(12) United States Patent
Hasegawa et al.

(10) Patent No.: US 7,631,022 B2
(45) Date of Patent: Dec. 8, 2009

(54) INFORMATION PROCESSING APPARATUS AND RECORDING MEDIUM

(75) Inventors: Takefumi Hasegawa, Tokyo (JP); Akira Suzuki, Kanagawa (JP); Masami Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 354 days.

(21) Appl. No.: 11/183,861

(22) Filed: Jul. 19, 2005

(65) Prior Publication Data
US 2006/0020645 A1 Jan. 26, 2006

(30) Foreign Application Priority Data
Jul. 21, 2004 (JP) .............................. 2004-212848
May 25, 2005 (JP) .............................. 2005-152743

(51) Int. Cl.
*G06F 12/00* (2006.01)
*G06F 13/00* (2006.01)
*H04N 1/00* (2006.01)

(52) U.S. Cl. .................. 707/204; 711/171; 358/426.05
(58) Field of Classification Search .................. 707/204
See application file for complete search history.

(56) References Cited

U.S. PATENT DOCUMENTS

| 5,764,972 | A * | 6/1998 | Crouse et al. .................. 707/1 |
| 5,907,703 | A * | 5/1999 | Kronenberg et al. ........ 719/321 |
| 6,169,930 | B1 * | 1/2001 | Blachek et al. ............... 700/79 |
| 6,381,405 | B1 * | 4/2002 | Yamagishi .................. 386/125 |
| 6,385,767 | B1 * | 5/2002 | Ziebell ........................ 717/170 |
| 6,879,988 | B2 * | 4/2005 | Basin et al. .................. 707/200 |
| 7,098,898 | B2 * | 8/2006 | Hattori et al. ............... 345/173 |
| 2003/0014441 | A1 | 1/2003 | Suzuki et al. |
| 2003/0095127 | A1 * | 5/2003 | Blais ........................... 345/555 |
| 2003/0154185 | A1 | 8/2003 | Suzuki et al. |
| 2003/0182446 | A1 | 9/2003 | Koide et al. |
| 2004/0220980 | A1 * | 11/2004 | Forster ........................ 707/204 |
| 2005/0010951 | A1 * | 1/2005 | Saito et al. .................... 725/46 |
| 2006/0143251 | A1 * | 6/2006 | Peterson et al. ............. 707/204 |
| 2006/0184505 | A1 * | 8/2006 | Kedem et al. .................. 707/1 |
| 2008/0012871 | A1 * | 1/2008 | Blais ........................... 345/555 |

OTHER PUBLICATIONS

Kobayashi et al. "Information Retrieval on the Web" IBM Research, ACM Computing Surveys, vol. 32, No. 2, Jun. 2000.*
U.S. Appl. No. 11/580,128, filed Oct. 13, 2006, Suzuki, et al.
U.S. Appl. No. 10/662,532, filed Sep. 16, 2003, Masami Koide, et al.
U.S. Appl. No. 10/743,091, filed Dec. 23, 2003, Akira Suzuki, et al.
U.S. Appl. No. 11/495,669, filed Jul. 31, 2006, Mori, et al.

* cited by examiner

*Primary Examiner*—Pierre M Vital
*Assistant Examiner*—Berhanu Mitiku
(74) *Attorney, Agent, or Firm*—Oblon, Spivak, McClelland, Maier & Neustadt, L.L.P.

(57) ABSTRACT

An information processing apparatus is disclosed that updates a desired block data item contained in an archive file in an archive file format. According to an update instruction from an update instructing part, a predetermined data item contained in the archive file is protected before the archive file is updated. The content of the protected predetermined data item is updated based on updated content of the block data item contained in the archive file. The updated predetermined data item is written into the archive file into which the updated block data item is written.

25 Claims, 30 Drawing Sheets

FIG.5

SIGNATURE: 4byte (504b0506)
STORAGE LOCATION OF TOP CEN DATA ITEM: 2byte
TOTAL NUMBER OF CEN DATA ITEMS: 2byte
UPDATE EXECUTION FLAG: 2byte

SIGNATURE: 4byte (504b0708)
SIZE OF BLOCK DATA ITEM: 4byte
STORAGE LOCATION OF BLOCK DATA ITEM: 4byte
FILE NAME LENGTH: 2byte (length)
FILE NAME: length byte

⋮

SIGNATURE: 4byte (504b0708)
SIZE OF BLOCK DATA ITEM: 4byte
STORAGE LOCATION OF BLOCK DATA ITEM: 4byte
FILE NAME LENGTH: 2byte (length)
FILE NAME: length byte

⋮

SIGNATURE: 4byte (504b0708)
SIZE OF BLOCK DATA ITEM: 4byte
STORAGE LOCATION OF BLOCK DATA ITEM: 4byte
FILE NAME LENGTH: 2byte (length)
FILE NAME: length byte

⋮

INFORMATION PROCESSING APPARATUS AND RECORDING MEDIUM

BACKGROUND OF THE INVENTION

1. Field of the Invention

The present invention relates to an information processing apparatus and a recording medium for processing an archive file in an archive file format in which one or more files converted into block data items are merged into a single file.

2. Description of the Related Art

Generally, a file used on a computer is stored in pieces in a recording medium such as a hard disk. The file stored in the recording medium is accessed through a file system function, which is supported by basic software, i.e., an operating system of the computer. A file system is a method for organizing files and their locations in recording media. For example, FAT16 (File Allocation Table), FAT32, and NTFS are well known as file systems for operating systems such as Windows (™). The recording medium includes a cluster area for storing data of the file in pieces, and a file system area (file allocation table, etc.) for indicating the location of the file stored in the cluster area. The file system function of the operating system refers to the file system area, accesses the data of the file stored in pieces in the cluster area, and thus reads the file.

On the other hand, application programs access the file by using the data of the file read from the recording medium by the file system function of the operating system. As the application programs perform file input/output operations through the file system function, the application programs can access the data of the file stored in pieces as a single file regardless of the cluster area of the recording medium.

File access systems used by the application programs are classified into a sequential file system and a random file system. In the sequential file system, data items of a file are sequentially stored from the top of the file without record number information or the like. Therefore, in data update/access operations, the data items are sequentially accessed from the top of the file. In contrast, in the random file system, because record numbers of records storing data of a file are managed, direct access to a desired record of the file is allowed.

An archive file format (ZIP, LHA, etc.) is one of the file formats used by the application programs. The archive file format holds plural files as a single file by compressing the files. Because the archive file format is configured such that plural files are compressed and merged into a single archive file having a reduced data size, the archive file format is useful for transmitting plural files (e.g. downloading files from a server) and therefore widely used. When the archive file is to be used, all the compressed data items are decompressed sequentially from the top of the archive file before the use.

In recent years and continuing, with improvements of computer processing capacity, the use of multimedia information, in which information such as sound, still images, moving images, and 3D images are integrated, is increasing. As the format used for sound, still images, moving images, and 3D images varies, multimedia information often includes plural files. The archive file format is convenient for transmitting such multimedia information including plural files.

The applicant of the present invention has proposed, in Patent Document 1, a data structure of a document (encapsulated document) in which plural content files, a document structure file for defining the structure of the content files, and an operations program corresponding to the document structure file are encapsulated as a single file. According to Patent Document 1, as an operations program for reading an electronic document is encapsulated (archived) into electronic document information, and the electronic document can be read in a computer environment different from the computer environment of the creator of the document. Additional information added by a user is configured to be displayed along with the electronic document information, thereby efficiently managing the additional information.

[Patent Document 1] Japanese Patent Laid-Open Publication No. 2003-099424

For reading a desired data item contained in the archive file, conventionally, all the data items contained in the archive file are decompressed. This results in a long processing time. To avoid such a disadvantage, the archive file format enables, only in read operations, direct access to a desired data item by using an attribute data item stored in the archive file in the same way as a random file format.

However, in an archive file format such as ZIP, it is not allowed to update only a desired block data item contained in the archive file. The reason that updating of only a desired block data item contained in the archive file is not allowed is as follows.

When information of a file compressed into a block data item contained in an archive file is modified, the sizes of the block data item after encoding often differ even if the file sizes before the encoding are the same (in a common compression system, because a code pattern is replaced by another code pattern, the code sizes after encoding differ even if the code sizes before the encoding are the same). Therefore, storage locations of data items located below the updated block data item are changed according to the change in the size of the updated block data item. If the block data item in the archive file is directly updated by a conventional update method, the storage location of the attribute data item is changed. Thus, the archive file is destroyed, and the attribute data item cannot be read any more. That is, in an archive file format such as ZIP, when the archive file is directly updated, data in the archive file cannot be read any more.

There are cases where a user wants to update only a part of multimedia information in an archive file format such as ZIP while using the multimedia information. Inconveniently, such an update operation cannot be allowed in a conventional archive file format because of the reason described above, although operations for directly reading a desired block data item are allowed. The same applies to the encapsulated document file of Patent Document 1. That is, if the encapsulated document file has an archive file format such as ZIP, additional information cannot be saved into the encapsulated document file for updating the file.

SUMMARY OF THE INVENTION

A general object of the present invention is to provide an information processing apparatus and a recording medium that solve at least one problem described above.

A specific object of the present invention is to provide an information processing apparatus and a recording medium that allow updating a desired data item contained in an archive file in an archive file format.

According to an aspect of the present invention, there is provided an information processing apparatus that processes an archive file in an archive file format in which one or more files converted into block data items are merged into a single file, comprising an update instructing part to issue an update instruction to update a desired block data item of the block data items contained in the archive file, an information protecting part to protect a predetermined data item contained in the archive file according to the update instruction from the update instructing part, a reading part to convert back the desired block data item contained in the archive file specified by the update instructing part so as to read a content of an original file of the desired block data item, a first updating part to update the content of the original file read by the reading part, a first writing part to convert the original file containing the content updated by the first updating part into an updated block data item so as to write the updated block data item into the archive file, a second updating part to update a content of the predetermined data item protected by the information protecting part based on the content of the original file updated by the first updating part, and a second writing part to write the predetermined data item containing the content updated by the second updating part into the archive file into which the updated block data item is written by the first writing part.

With the present invention, a desired data item contained in an archive file in an archive file format can be updated.

BRIEF DESCRIPTION OF THE DRAWINGS

FIG. 5 illustrates an example of an attribute data item held in an END data item;

FIG. 6 illustrates an example of an attribute data item held in a CEN data item;

DETAILED DESCRIPTION OF THE PREFERRED EMBODIMENT

First Embodiment

The following describes a first embodiment of the present invention with reference to FIGS. 1 through 14.

As the present invention relates to handling of data files used by application programs on various information processing apparatuses represented by personal computers, a configuration of a common personal computer is described below.

[1. Configuration of Personal Computer 1]

Figure 1:
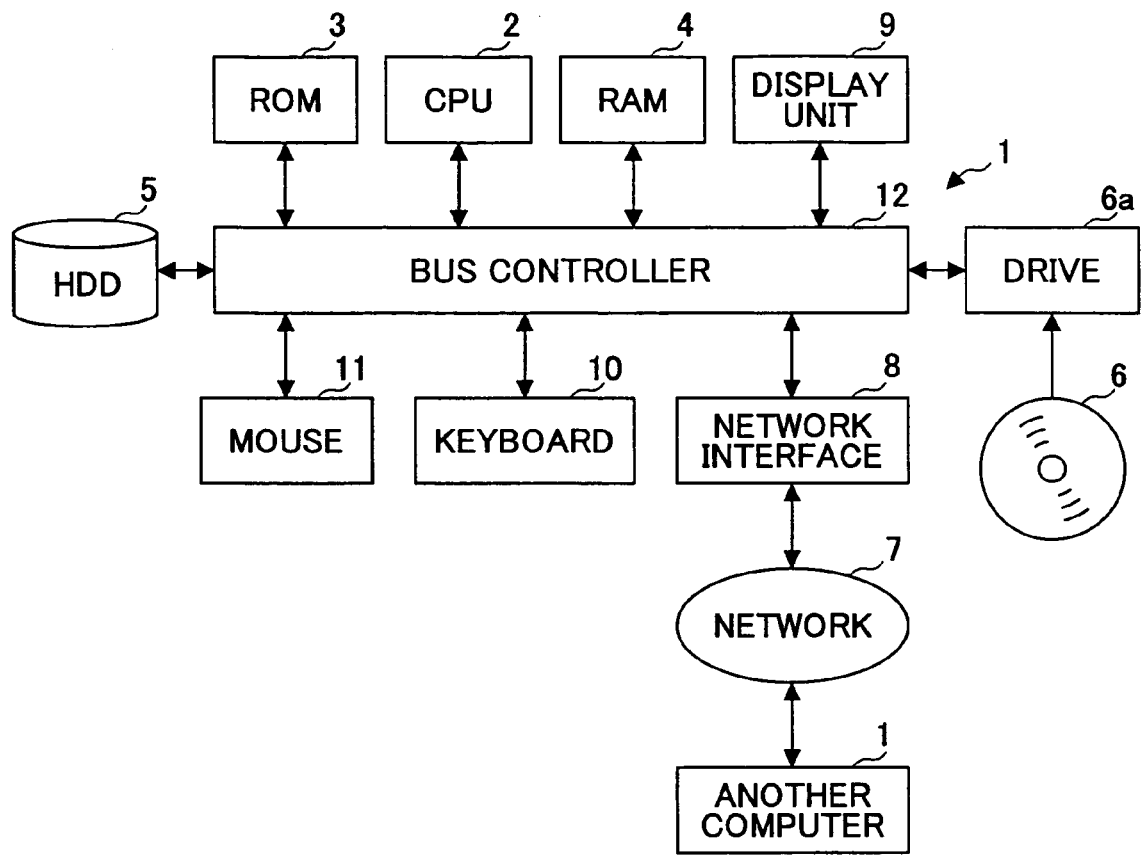
FIG. 1 is a block diagram illustrating a hardware configuration of a common or standard personal computer to which a first embodiment of the present invention is applied.

FIG. 1 is a block diagram illustrating a hardware configuration of a common or a standard personal computer 1 to which the first embodiment of the present invention is applied. The personal computer (hereinafter referred to as a computer) 1 comprises a CPU (Central Processing Unit) 2 for processing information, a ROM (Read Only Memory) 3 for holding programs and data such as BIOS (Basic Input Output System), a memory unit such as a RAM (Random Access Memory) 4 for temporarily holding information during information processing, a secondary storage unit such as a HDD (Hard Disk Drive) 5 for storing application programs, processing results, and data files, etc., a drive 6a for a removable medium 6 as a recording medium used for storing information, distributing information to external devices, and providing the computer 1 with information such as data files and application programs from external devices, a network interface 8 for providing connection to a network 7 so as to communicate with another computer 1', a display unit 9 for displaying processing progress and processing results, and input units such as a keyboard 10 and a mouse 11 with which users input instructions and information into the computer 1. Data communication among these parts is achieved through a bus controller 12.

The removable medium 6 may include a variety of recording media: magnetic recording media such as a flexible disk, a hard disk, and a magnetic tape; magnetic optical recording media such as MO; optical recording media such as CD, CD-ROM, CD-R, CD-RW, DVD-ROM, DVD-R, DVD-RAM, DVD-RW, and DVD+RW; and semiconductor memories.

In data sending operations, the computer 1 sends data to the network interface 8. The network interface 8 outputs signals to the network 7 based on the data. In data receiving operations, the network interface 8 receives signals and determines the necessity. Then, the network interface 8 takes in data if it determines necessary, and discards data if it determines unnecessary. Namely, all data are sent and, received via the network interface 8.

When the computer 1 is powered on, the CPU 2 starts a certain program called a loader contained in the BIOS stored in the ROM 3, and reads an operating system, which is a program for managing hardware and software of the computer 1, from the HDD 5 into the RAM 4. When the operating system is started, it supports starting application programs and reading/saving information in accordance with user's operations. One typical example of operating systems is Windows (™). Programs that run on an operating system are called application programs. Generally, digital information stored in a storage unit for starting a desired application program via an operating system and for editing/saving/deleting desired data is handled as files. In other words, when a user performs operations on a computer, application programs and data are handled as "files", which are stored in a storage unit.

Figure 2:
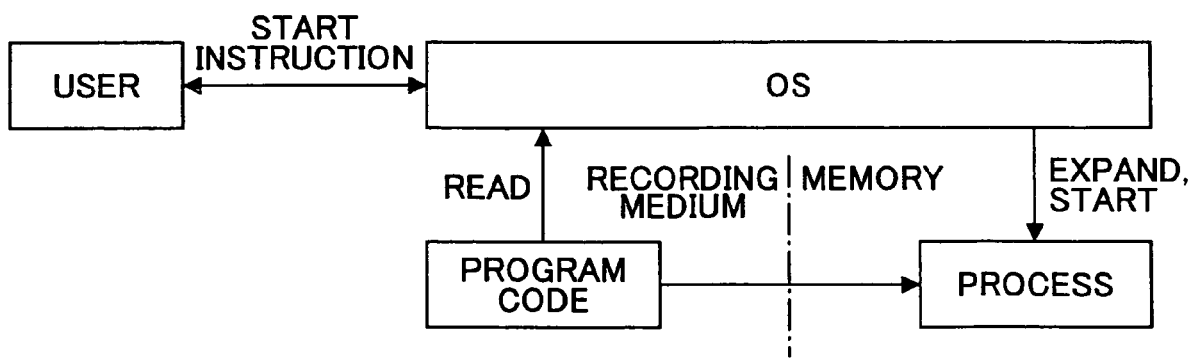
FIG. 2 is a block diagram illustrating functions of an operating system.

An operation for starting an application program stored in a recording medium such as a secondary storage unit in response to a user's instruction is as follows. FIG. 2 is a block diagram illustrating functions of an operating system. When a user instructs the operating system to start a certain program, the operating system reads corresponding program codes from a recording medium using hardware of a storage unit. The program codes are expanded onto the RAM 4 as a memory unit of the computer 1, so the CPU 2 executes the program from a specified address based on the expanded program codes. In general, such an independently executed program is called a "process" or a "task", which is differentiated from the "program codes" held by the recording medium.

Most of the currently-available operating systems offer a multitasking function for simultaneously running plural processes or tasks. For simultaneously running plural processes, theses currently-available operating systems allocate a memory area individually for each process.

For the purpose of exchanging data between processes, i.e., inter-process communication, a virtual file called a metafile that serves as a file access is created in memory. Information is sent/received through the file access.

[2. Data File]

An application program of the personal computer 1 of this embodiment uses a data file in an archive file format, which contains a bundle of plural files compressed into a single file.

In the archive file format, plural files are compressed into plural block data items, and the compressed block data items are sequentially stored in an archive file. Thus, the plural files are compressed into a single archive file. As the block data items into which the files are compressed have different data sizes, block data items with various sizes are sequentially stored from the top in the archive file format. Usually, the archive file is used (read, and updated) after the compressed block data items contained in the archive file are decompressed sequentially from the top of the archived file in the same way as a sequential file format. However, with this method, even for reading a desired block data item contained in the archive file, all the block data items contained in the archive file are decompressed. This results in a long processing time. To avoid such a disadvantage, only in read operations, a desired block data item can be directly read by using attribute data items stored in the archive file in the same way as a random file format.

Figure 3:
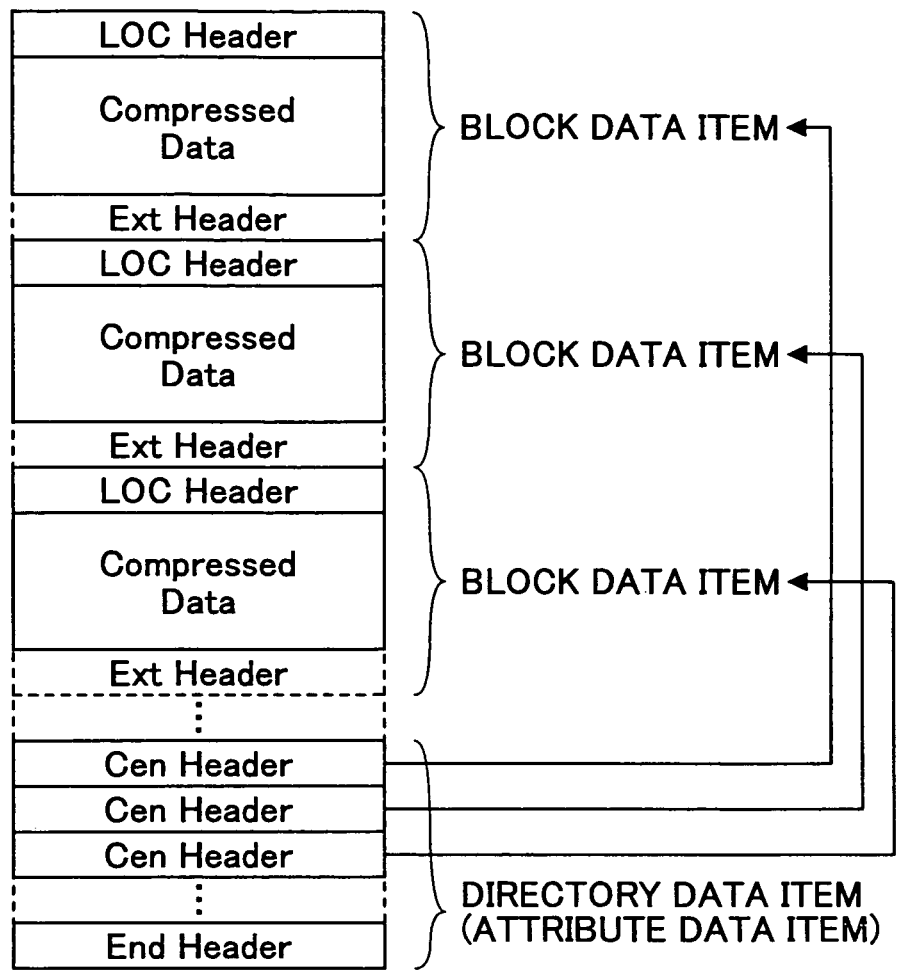
FIG. 3 is a format example of a ZIP file.

A ZIP file format is the most widely used archive file format. FIG. 3 is a format example of a ZIP file. A typical ZIP file has a multi-file archive format in which information contained in plural files is compressed into block data items so as to be merged into a single file. The extension that represents this type of file is ".zip". The ZIP file has a format as shown in FIG. 3. The ZIP file format comprises block data items of individual files, each including a LOC data item (Local file header) as an attribute data item, a compressed data item therebelow, and an Ext data item (Extended local header) as an attribute data item which is not necessarily required, CEN data items (Central directory) as attribute data items corresponding to the block data items, and an END data item (End of Central directory) as an attribute data item. That is, if three files are compressed into a single file in the ZIP format, three compressed block data items each starting with a LOC data item, three CEN data items, and one END data item are contained in that order from the top of the file.

Figure 4:
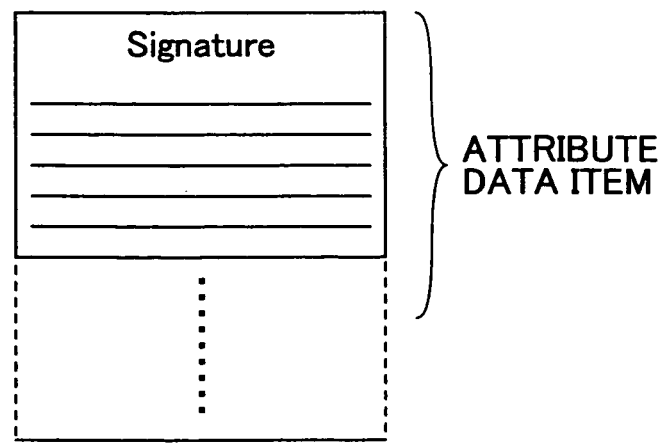
FIG. 4 illustrates an attribute data item beginning with a signature.

FIG. 4 illustrates an attribute data item beginning with a signature. With reference to FIG. 4, each attribute data item begins with a four bytes signature (a symbol or an identifier representing a format of the data item) indicating that the item is an attribute data item. Attribute data items can be detected by detecting the signature. Each signature begins with a two byte ASCII code of "PK", which is derived from the background of ZIP developments.

FIG. 5 illustrates an example of the attribute data item held in the END data item. FIG. 6 illustrates an example of the attribute data item held in the CEN data item. The END data item includes a signature at the top indicating that the item is an END data item, followed by an attribute data item indicating the location of a top CEN data item stored in the archive file, an attribute data item indicating the total number of the CEN data items stored in the archive file, and the like. The END data item may include attribute data items such as an update execution flag if necessary. A default value of the update execution flag is "False". The CEN data item includes a signature indicating that the item is an CEN data item at the top, followed by attribute information indicating the size of a corresponding block data item, attribute information indicating the location of the block data item stored in the archive file, attribute information indicating the name of a file before being compressed as the block data item, and the like.

ZIP files are used in the same manner as other archive files. Basically, compressed block data items are decompressed from the top of a ZIP file by a predetermined decompression method so as to restore and use information contained before compression. As the storage locations and the name of block data items contained in the ZIP file can be detected based on attribute data items in the END data item and attribute data items in the CEN data item corresponding to the block data items in the ZIP file, it is allowed, only in read operations, to directly decompress and read a desired block data item contained in the ZIP file. More specifically, in an operation for decompressing (restoring) only a block data item desired by a user from an archive file, an END data item in the archive file is identified based on signatures, and the storage location of a CEN data item is identified based on attribute data items contained in the END data item. Then, a storage location of a block data item corresponding to the file desired by the user is detected, and only the block data item stored in an arbitrary location in the archive file is directly decompressed and read.

[3. Unique Features of Computer 1]

In the computer 1, when an application program operable on the operating system is started, the CPU 2 performs computation and controls each unit of the computer 1 according to the application program. Among various types of computation performed by the CPU 2 of the computer 1, operations unique to this embodiment are described below.

Figure 7:
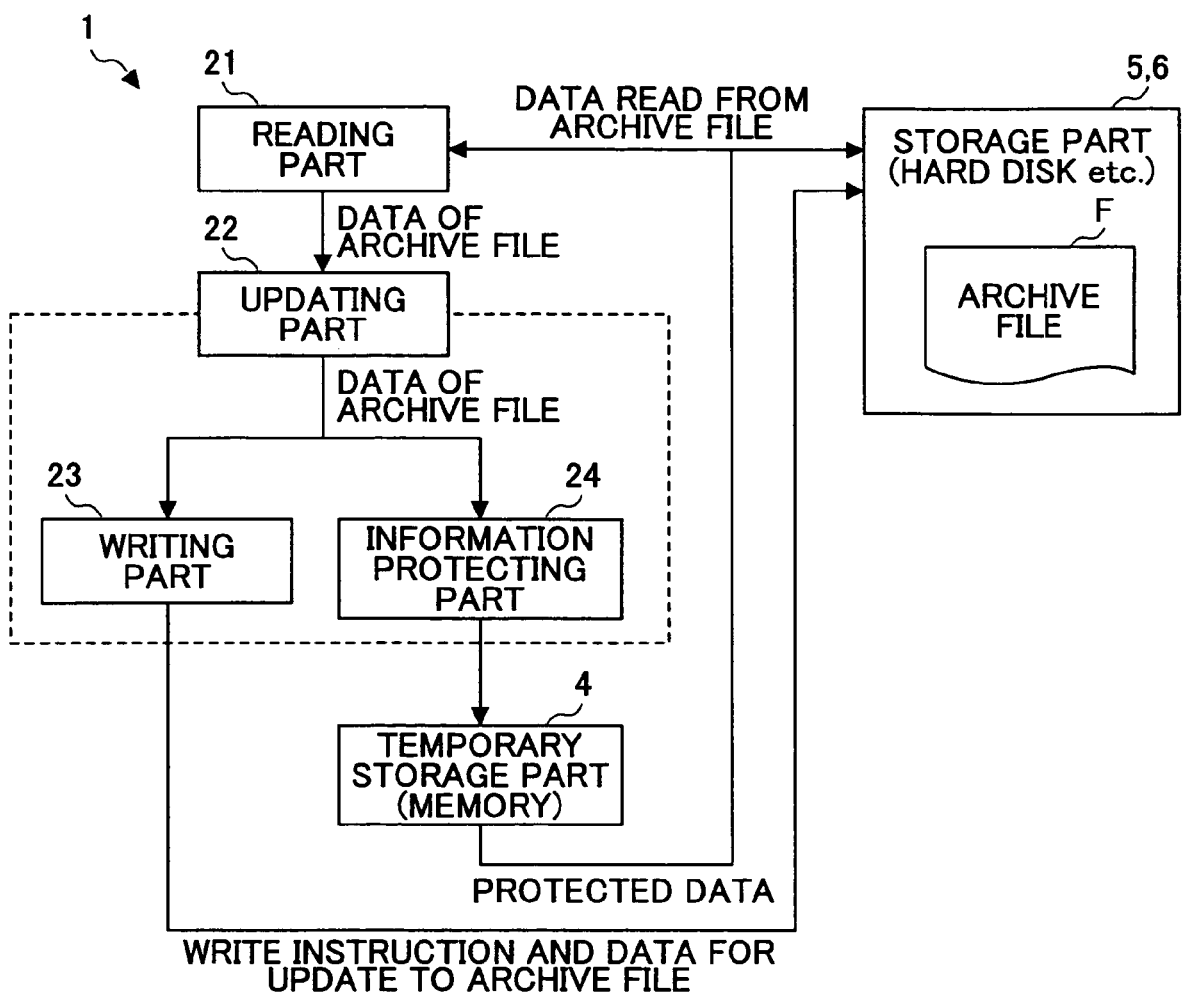
FIG. 7 is a functional block diagram of a computer.

FIG. 7 is a functional block diagram of the computer 1. With reference to FIG. 7, the computer 1 provides a reading part 21 and an updating part 22 in accordance with an application program being executed on the operating system by the CPU 2. In FIG. 7, a temporary storage part (memory) corresponds to the RAM 4, and a storage part for holding data such as an archive file F corresponds to the HDD 5 or the removable medium 6.

The reading part 21 is configured to inversely convert a desired block data item to be read in a data file or the archive file F held in the storage part and the temporary storage part so as to read contents of the file as existing before conversion (compression).

The updating part 22 is configured to directly update a desired block data item in the archive file F. The updating part 22 includes a writing part 23 and an information protecting part 24. The writing part 23 is configured to directly write data for updating in the archive file F held in the storage part. When data are directly written into the archive file F, the archive file format is destroyed. In order to protect the archive file format, the information protecting part 24 moves data contained in the archive file F into a temporary storage part before the format is destroyed, thereby protecting the data contained in the archive file F.

[3-1. Archive File Update Operation]

Figure 8:
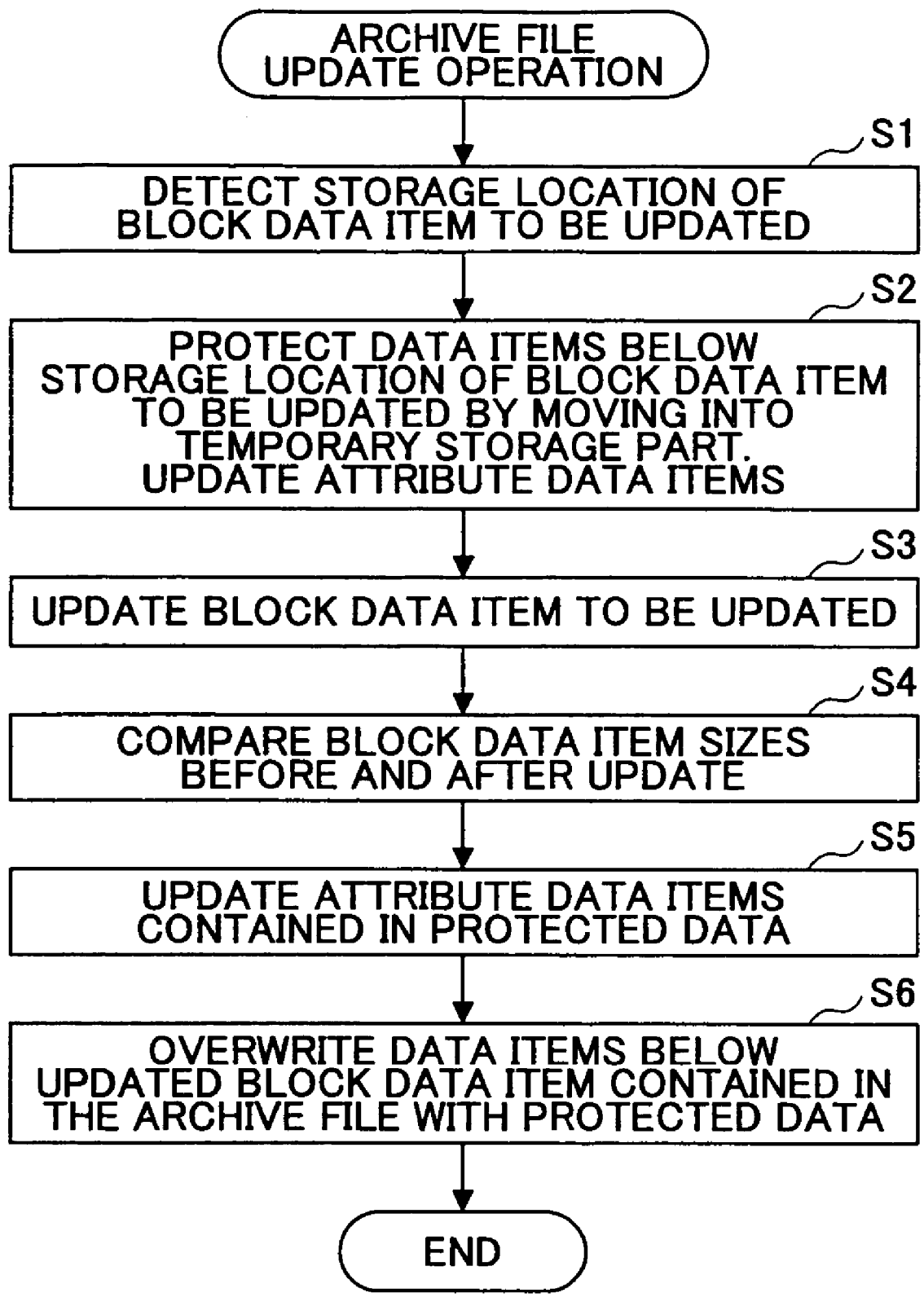
FIG. 8 is a flowchart illustrating an archive file update operation.
Figure 9:
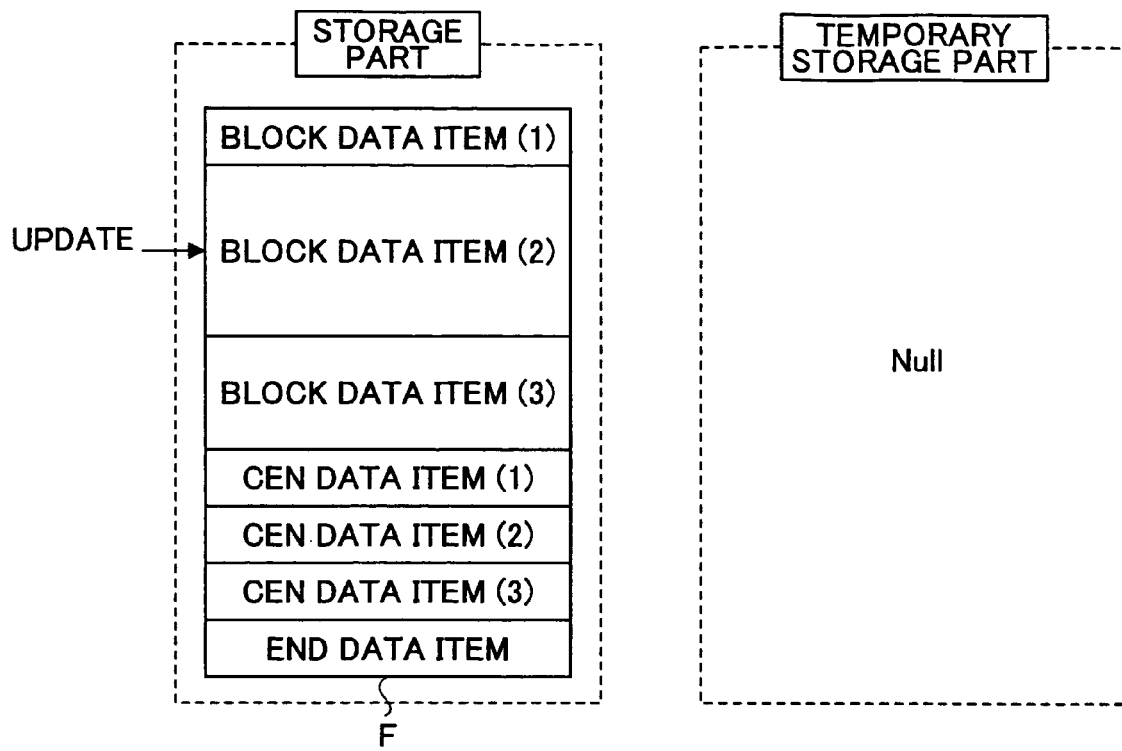
FIG. 9 shows data of an archive file in a storage part and a temporary storage part on completion of one step.

This section describes an archive file update operation performed by the updating part 22 in detail. FIG. 8 is a flowchart illustrating the archive file update operation. With reference to FIG. 8, in the archive file update operation, a storage location of a block data item to be updated is detected by reading the archive file F held in the storage part (HDD 5 or removable medium 6) (step S1: update instructing part). For detecting the storage location of the block data item to be updated, the storage location of an END data item is detected based on signatures contained in the archive file F. In the thus detected END data item, an attribute data item indicating the storage location of a CEN data item is referred to so as to read the CEN data item. In the CEN data item, an attribute data item indicating the storage location of the block data item is referred to so as to detect the storage location of the block data item to be updated. FIG. 9 shows data of the archive file F in the storage part and the temporary storage part on completion of step S1.

Figure 10:
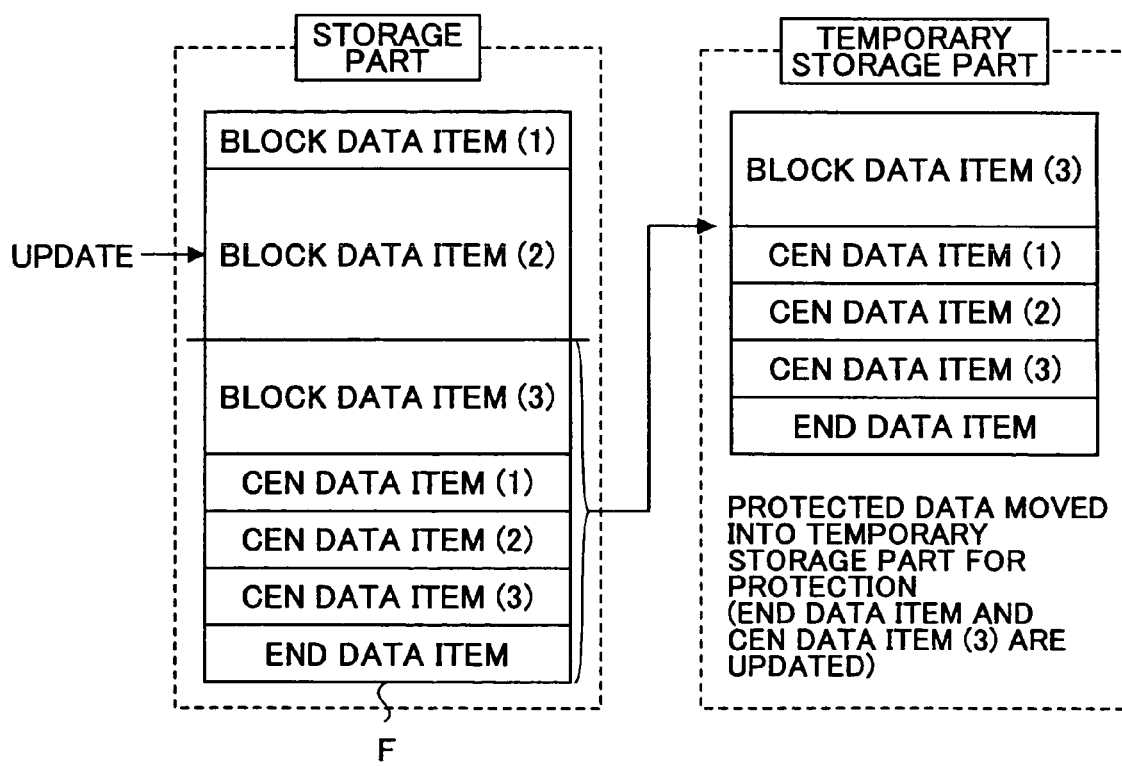
FIG. 10 shows the data of the archive file in the storage part and the temporary storage part on completion of another step.

In step S2, data items in the archive file F located below the block data item detected in step S1 are temporarily moved into the temporary storage part for protection, and attribute data items contained in the protected data are updated (information protecting part). The attribute data items to be updated herein include the END data item, and the CEN data item corresponding to the block data item located below the block data item to be updated. In the END data item, an attribute data item indicating the storage location of a top CEN data item is updated so as to indicate a storage location of a top CEN data item stored in the protected data moved into the temporary storage part. In the CEN data item to be updated herein, an attribute data item indicating a storage location of the corresponding block data item is updated so as to indicate a storage location of the corresponding block data item contained in the protected data moved into the temporary storage part. If an attribute data item of an update execution flag is included in the END data item of the archive file F held in the storage part, the update execution flag of the archive file F held in the storage part is set to "True" for indicating that the archive file F is being updated. FIG. 10 shows the data of the archive file F in the storage part and the temporary storage part on completion of step S2.

Figure 11:
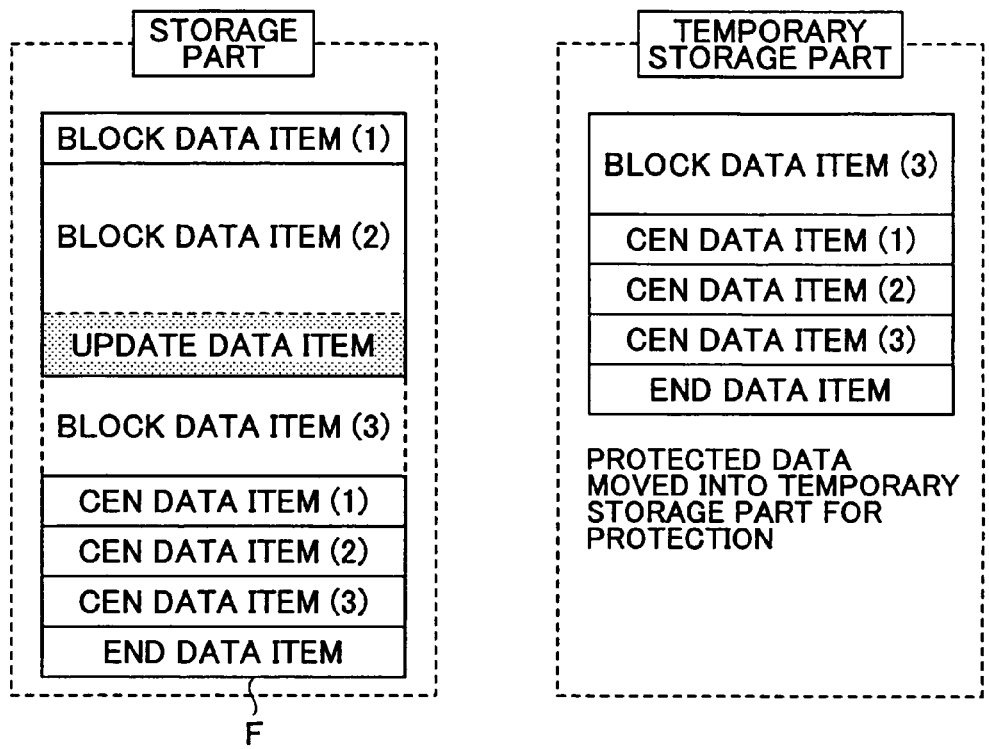
FIG. 11 shows the data of the archive file in the storage part and the temporary storage part on completion of another step.

In step S3, an update operation is carried out by writing an update block data item into the block data item to be updated in the archive file F held in the storage part. In the write operation, for example, the block data item to be updated may be decompressed to be inversely converted into file data (reading part), so the file data are updated (first updating part). Then, the updated file data are compressed again to be converted into a block data item. This updated block data item is written into a storage location of the block data item to be updated in the archive file F (first writing part). The archive file format is destroyed due to a size change of the updated block data item upon this write operation. Therefore, if an update operation is performed without protecting the data in the archive file F, the data in the archive file F cannot be read any more. FIG. 11 shows the data of the archive file F in the storage part and the temporary storage part on completion of step S3.

In step S4, the size of the block data item after the update is calculated to be compared with the size of the block data item before the update. With this compare operation, the difference between the sizes of the block data item (compression sizes) before and after the update is calculated. The size of the block data item before the update used in the compare operation may be acquired by referring to attribute information in the protected data temporarily protected by the temporary storage part, or may be acquired by calculating the data size before updating the block data item in advance. The size of the block data item after the update may be acquired by calculating the size of the block data item in the archive file held in the storage part after the update, or may be acquired by calculating a size of the update block data item upon the write operation.

Figure 12:
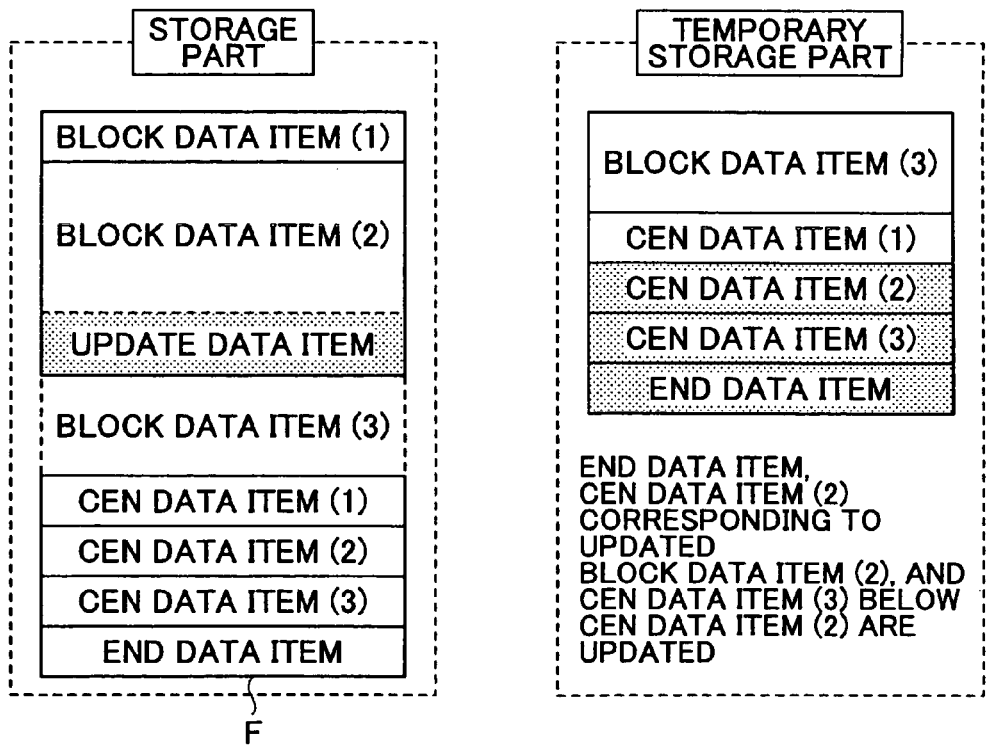
FIG. 12 shows the data of the archive file in the storage part and the temporary storage part on completion of another step.

In step S5, the attribute data items contained in the protected data protected in the temporary storage part are updated according to information about the calculated difference of the block data item size (second updating part). The attribute data items to be updated herein include the END data item and the CEN data items. For example, if the size increase is X bytes according to the block data item size difference information, the value of the attribute data item in the END data item indicating the storage location of the top CEN data item is updated by adding X bytes to the value of the attribute data item of step S2 existing before the block data item update operation. If one or more new files are added to the archive file F in the update operation of step S3, a value corresponding to the number of added files is added to the value of the attribute data item in the END data indicating the total number of the CEN data items. As for the CEN data items, the CEN data item corresponding to the updated block data item and the CEN data items therebelow are updated. In the CEN data item corresponding to the updated block data item, attribute information indicating the size of the corresponding block data item is changed so as to indicate the size of the updated block data item. If a file name or the like is updated in the update operation of step S3, attribute information indicating the file name length and attribute information indicating the file name are also updated. In the CEN data item below the updated CEN data item, the value of the attribute data item indicating the storage location of the corresponding block data item is updated by adding X bytes to the value of the attribute data item of step S2 existing before the block data item update operation. FIG. 12 shows the data of the archive file F in the storage part and the temporary storage part on completion of step S5.

Figure 13:
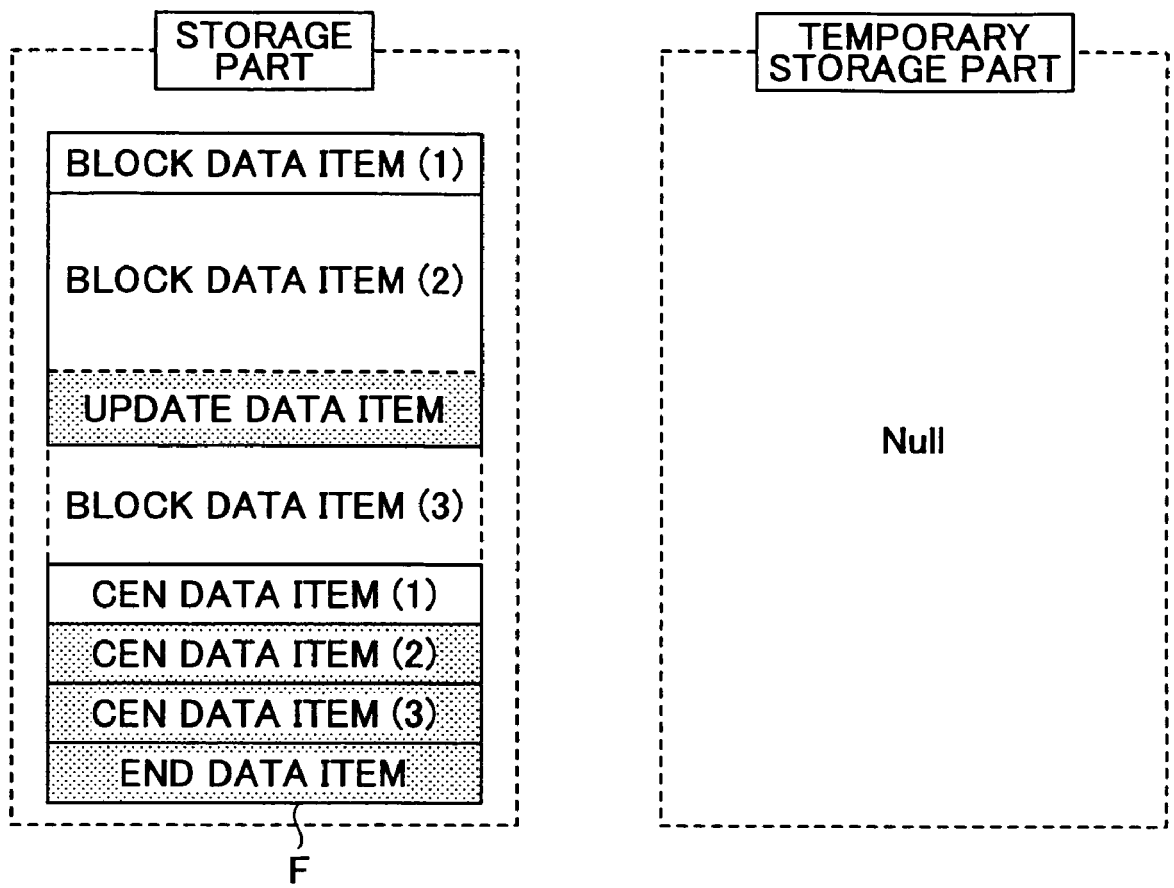
FIG. 13 shows the data of the archive file in the storage part and the temporary storage part on completion of another step.

Finally, in step S6, the data items below the updated block data item in the archive file F held in the storage part are overwritten with the protected data (second writing part). If the attribute data item of the update execution flag is included in the END data item contained in the archive file F, the update execution flag is updated to "False" to indicate completion of the update operation of the archive file F. FIG. 13 shows the data of the archive file F in the storage part and the temporary storage part on completion of step S6.

With the above-described operations, the data items below the block data item to be updated are moved into the temporary storage part before the update operation of the archive file F, so that the data in the archive file F are protected. Therefore, even when a desired block data item contained in the archive file F is directly updated, the block data items contained in the archive file F are kept readable. Thus, the data in the archive file format can be protected.

[3-2. File Read Operation in Archive File Update Operation]

Figure 14:
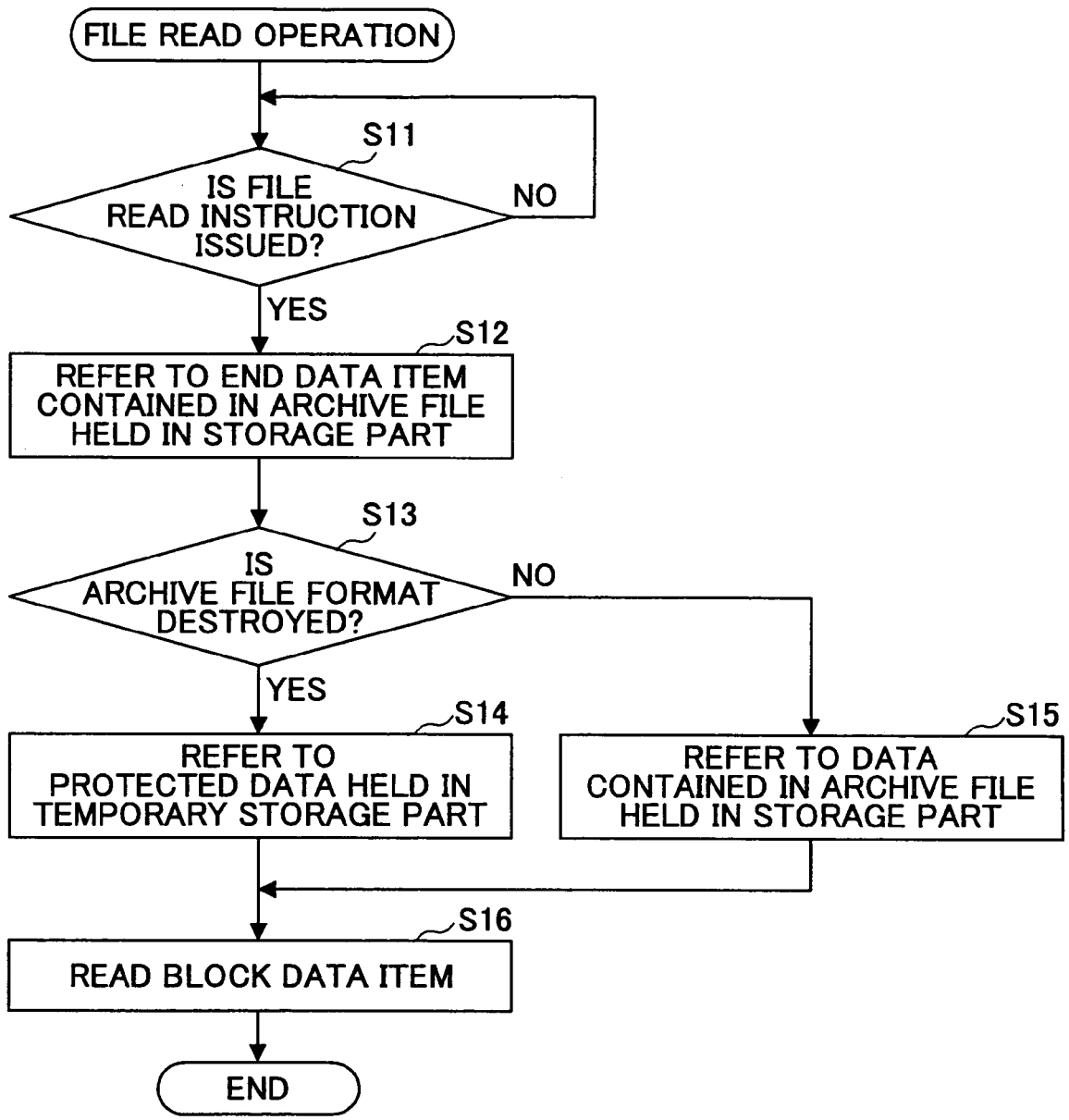
FIG. 14 is a flowchart illustrating a file read operation in an archive file update operation.

This section describes a file read operation performed by the reading part 21 and the updating part 22 in an archive file update operation in detail. FIG. 14 is a flowchart illustrating a file read operation in an archive file update operation. With reference to FIG. 14, if an file read instruction is issued during an archive file update operation (step S11: Yes), the END data item in the archive file F held in the storage part is referred to (step S12). If the attribute data item of the update execution flag is included in the END data item, the flag value is referred to. If, otherwise, the attribute data item of the update execution flag is not included in the END data item, the attribute data item indicating the storage location of the top CEN data item in the END data item is referred to.

In step S13, it is determined whether the archive file format referred to in step S12 is destroyed, that is, whether the update operation is being executed.

When the attribute data item of the update execution flag is included, the determination is made according to the flag value. If the flag value of the update execution flag is "True", the archive file F is being updated. Therefore, the archive file format is determined as destroyed (step S13: Yes), and the processing proceeds to step S14. If, otherwise, the flag value is "False", the archive file F is not being updated. Therefore, the archive file format is determined as not destroyed (step S13: No), and the processing proceeds to step S15.

On the other hand, when the attribute data item indicating the update execution flag is not included in the END data item, a data item at the storage location of the top CEN data item is referred to according to the attribute data item indicating the storage location of the top CEN data item in the END data item. If the referred to data item is a signature as an identification of the CEN data item, the archive file format is determined as not destroyed (step S13: No) and the processing proceeds to step S15. If, otherwise, the referred to data item is not the signature, the archive file format is determined as destroyed (step S13: Yes) and the processing proceeds to step S14.

In step S14, the protected data moved into the temporary storage part are referred to. The protected data are the data of the archive file F moved into the temporary storage part in step S2 in the flowchart of the archive file update operation shown in FIG. 8. In the END data item protected as the protected data, an attribute data item indicating the storage location of the top CEN data item is referred to so as to refer to the CEN data item. In the CEN data item, information about a storage location of the block data item is referred to so as to specify a storage location of the block data item to be read. Then, the processing proceeds to step S16. If the block data item to be read is identical to the block data item to be updated, the read operation may be suspended until completion of the update operation of the block data so as to read the updated block data item.

In step S15, the data in the archive file F held in the storage part are referred to. Step S15 is the same as a conventional read operation of the archive file F. That is, the END data item in the archive file F held in the storage part is referred to, and then the CEN data item is referred to. Thus, the storage location of the block data item to be read is specified, and the processing proceeds to step S16.

Finally, in step S16, the block data item at the storage location specified in step S14 or step S15 is read.

With the above-described operations, as a desired block data item can be directly read even if the archive file F in the archive file format is being updated, the convenience of the archive file format is improved.

According to this embodiment, all the data items in the archive file F located below a block data item specified by the update instructing part are moved into the temporary storage part for protection by the information protecting part 24 before the update operation of the archive file F. Then, predetermined contents in the protected data items are updated in accordance with the update of the block data item contained in the archive file F. The protected data items with the predetermined contents updated are written into the archive file F containing the updated block data item. Therefore, even if a desired block data item contained in the archive file F is directly updated, the block data items contained in the archive file F can be kept readable without destroying the archive file format. That is, the archive file F can be updated while protecting the data in the archive file format.

It should be understood that the present invention is not limited to the specifically disclosed embodiment, and variations and modifications may be made without departing from the scope of the present invention.

Second Embodiment

A second embodiment of the present invention is described with reference to FIGS. 15 through 22. Elements identical to those in the first embodiment bear the same reference numbers and are not further described. The second embodiment is different from the first embodiment in the flow of the archive file update operation. More specifically, while the data items in the archive file F below the block data item to be updated are moved into the temporary storage part in the update operation of the archive file F so as to protect data in the archive file format in the first embodiment, only the attribute data items (CEN data items and END data item) in the archive file F are moved into the temporary storage part so as to protect data in the archive file format in this embodiment.

[1. Unique Features of Computer 1]
[1-1. Archive File Update Operation]

Figure 15:
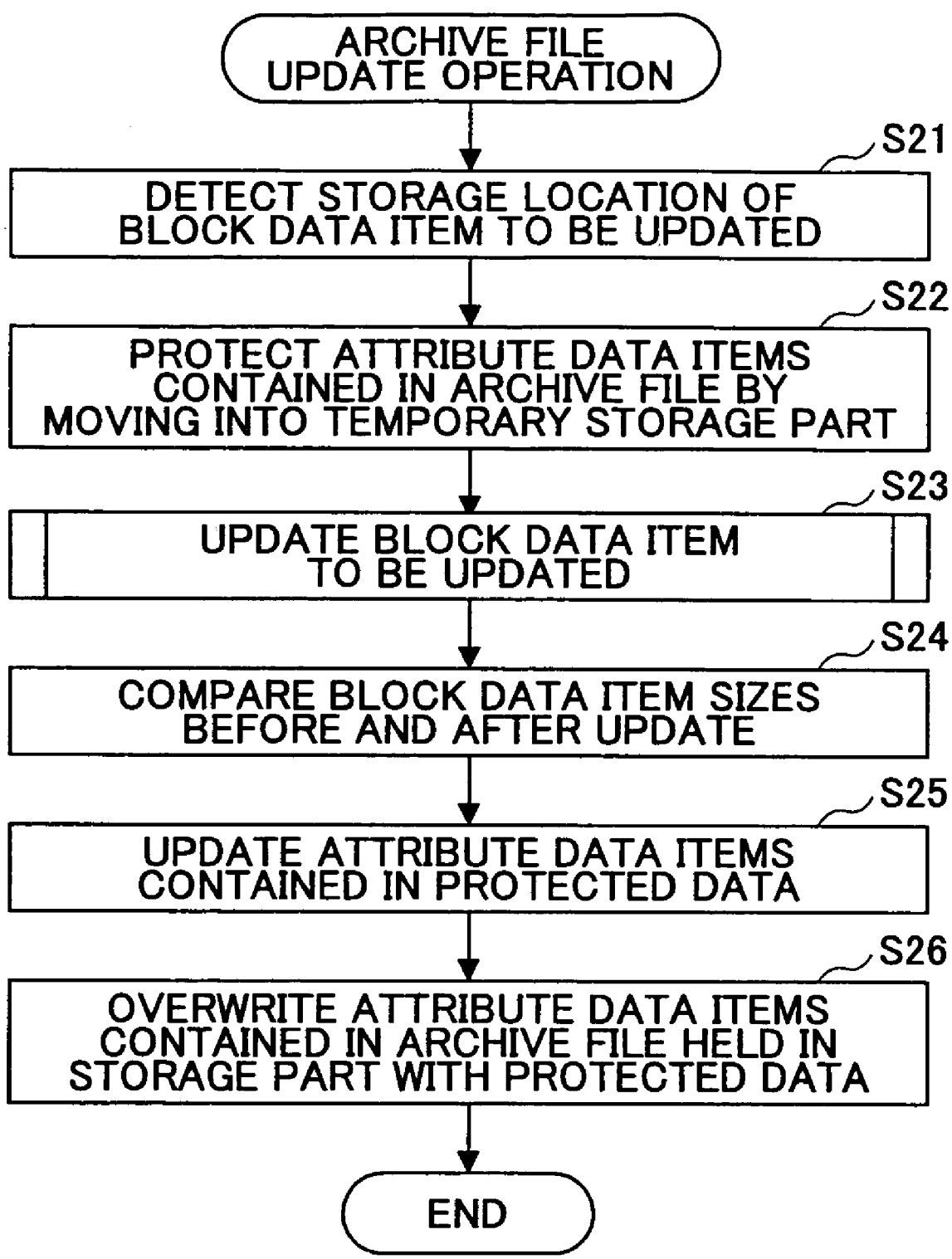
FIG. 15 is a flowchart illustrating an archive file update operation according to a second embodiment of the present invention.

This section describes an archive file update operation performed by the updating part 22 in detail. FIG. 15 is a flowchart illustrating an archive file update operation according to this embodiment. With reference to FIG. 15, a storage location of a block data item to be updated is detected by reading the archive file F held by the storage part (HDD 5 or removable medium 6) (step S21: update instructing part). The storage location of the block data item to be updated may be detected in the same manner as in the first embodiment.

Figure 16:
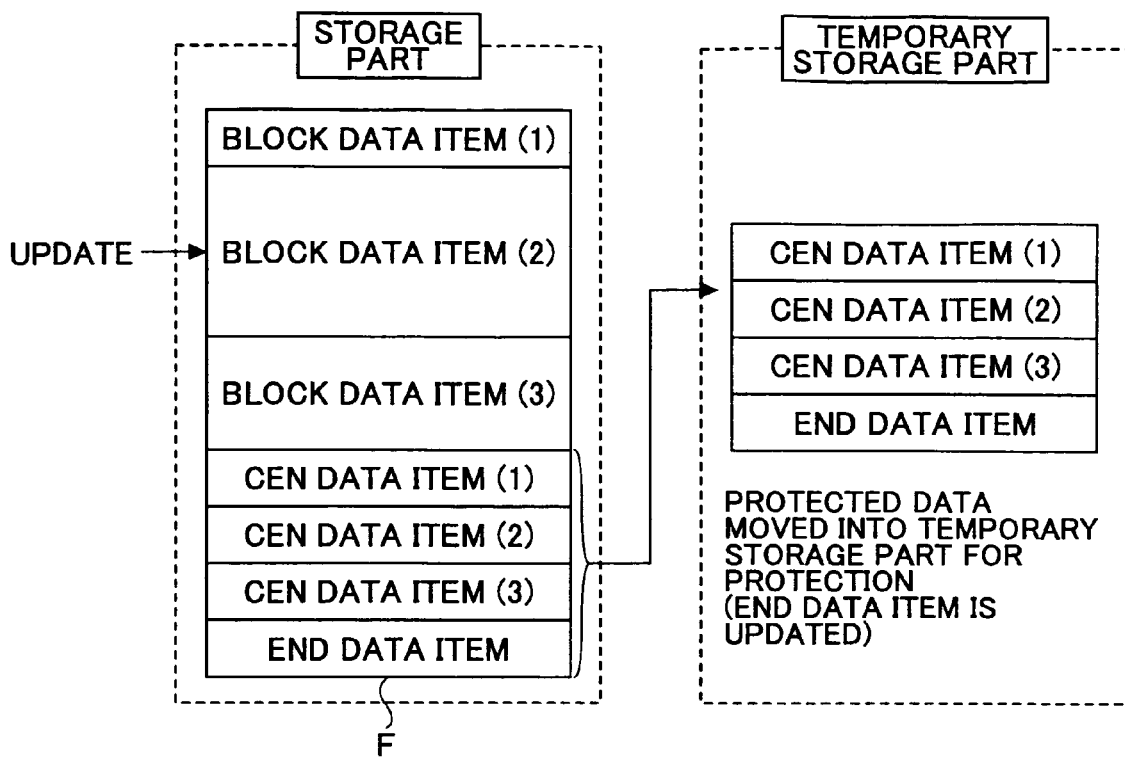
FIG. 16 shows data of an archive file in a storage part and a temporary storage part on completion of one step.

Then, only the attribute data items (CEN data item and END data item) contained in the archive file F are temporarily moved into the temporary storage part for protection, and the attribute data items moved into the protected data are updated (step S22: information protecting part). The attribute data items to be updated herein include the END data item. In the END data item, an attribute data item indicating the storage location of the top CEN data item is updated so as to indicate the storage location of the top CEN data item stored in the protected data moved into the temporary storage part. If an attribute data item of an update execution flag is included in the END data item of the archive file F held in the storage part, the update execution flag of the archive file F held in the storage part is set to "True" for indicating that the archive file F is being updated. FIG. 16 shows the data of the archive file F in the storage part and the temporary storage part on completion of step S22.

In step S23, an update operation is carried out by writing an update block data item into the block data item to be updated in the archive file F held in the storage part. In the write operation, for example, the block data item to be updated may be decompressed to be inversely converted into file data (reading part), so the file data are updated (first updating part). Then, the updated file data are compressed again to be converted into a block data item. This updated block data item is written into the storage location of the block data item to be updated in the archive file F (first writing part).

Figure 17:
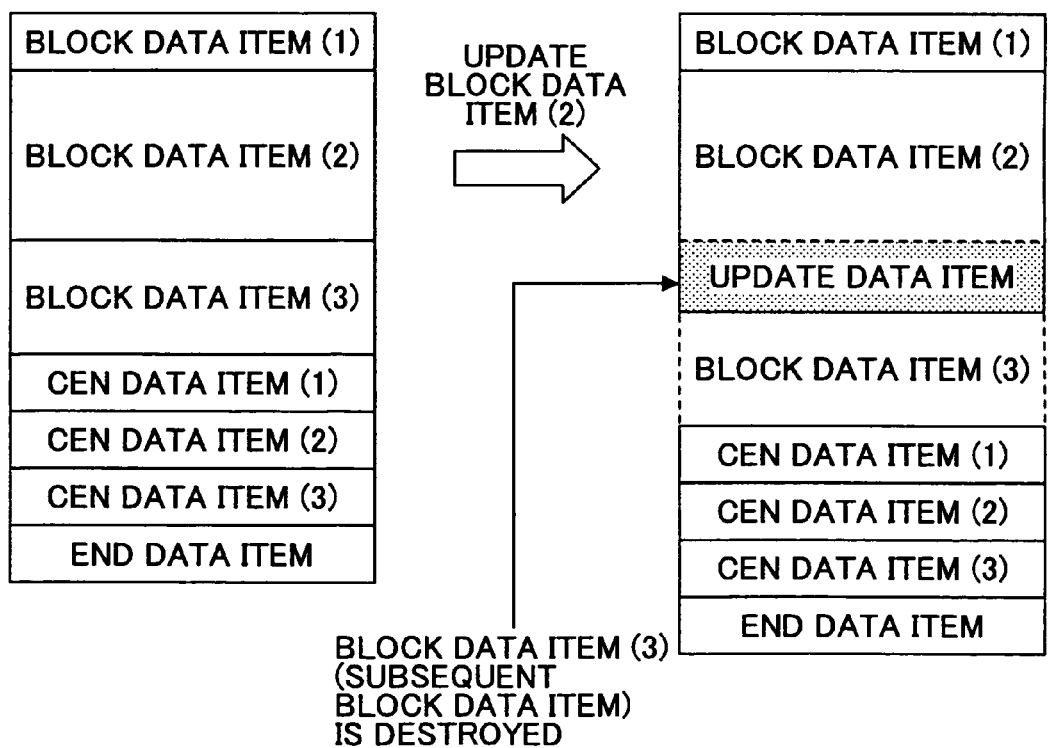
FIG. 17 shows data with a subsequent block data item destroyed by an update operation.

FIG. 17 illustrates a block data item destroyed by an update operation. In this embodiment, because only the attribute data items (CEN data items and END data item) are protected in the write operation, a subsequent block data item directly below the updated block data item is destroyed if the size of the block data item after the update is larger than the size of the block data item before the update. To avoid such destruction, in step S23, the size of the block data item before the update is compared with the size of the block data item after the update upon writing the update block data item. If the size of the block data item after the update is larger, the subsequent block data item is moved into the temporary storage part for protection.

Figure 18:
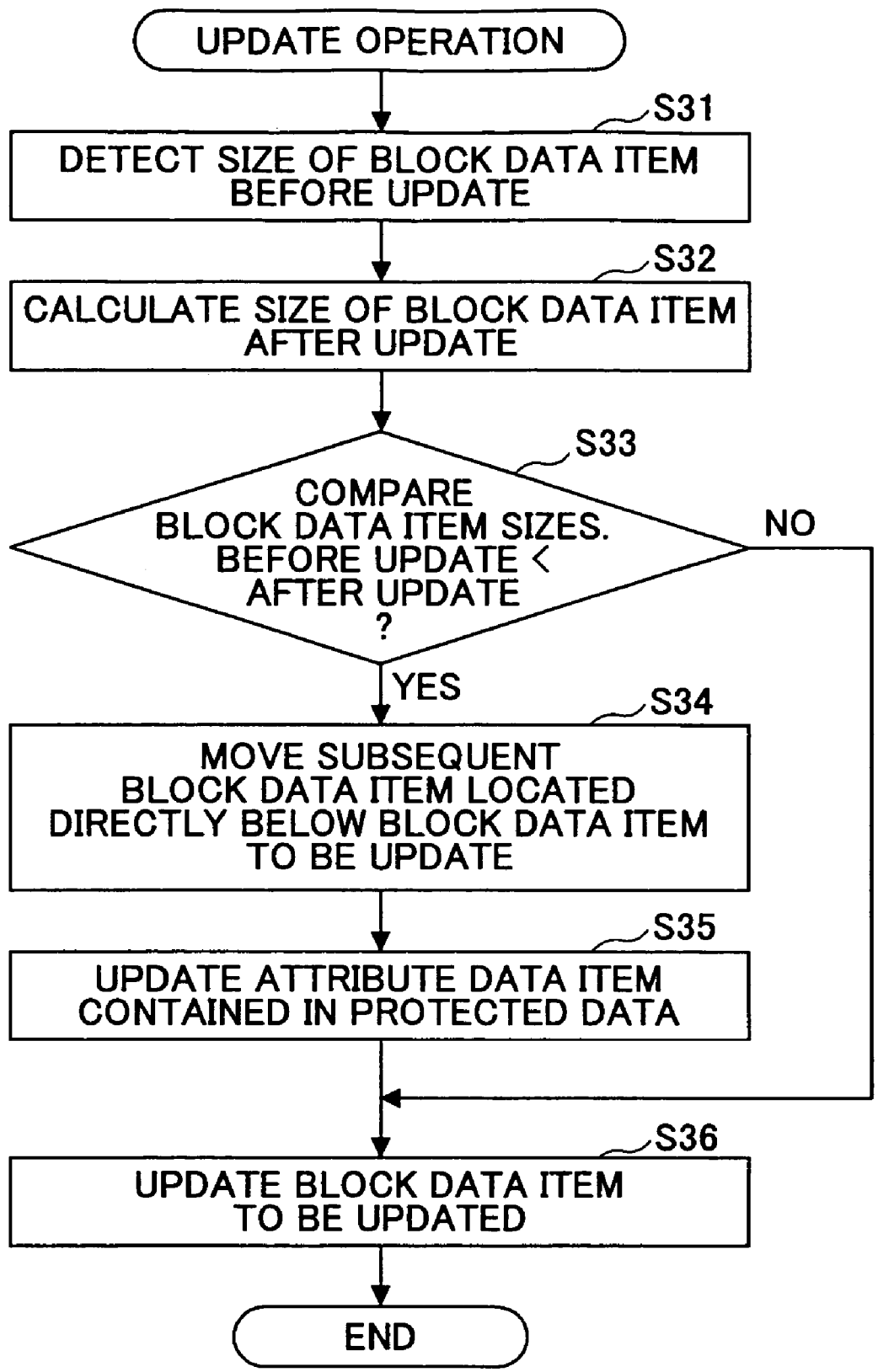
FIG. 18 is a flowchart illustrating an update operation.
Figure 19:
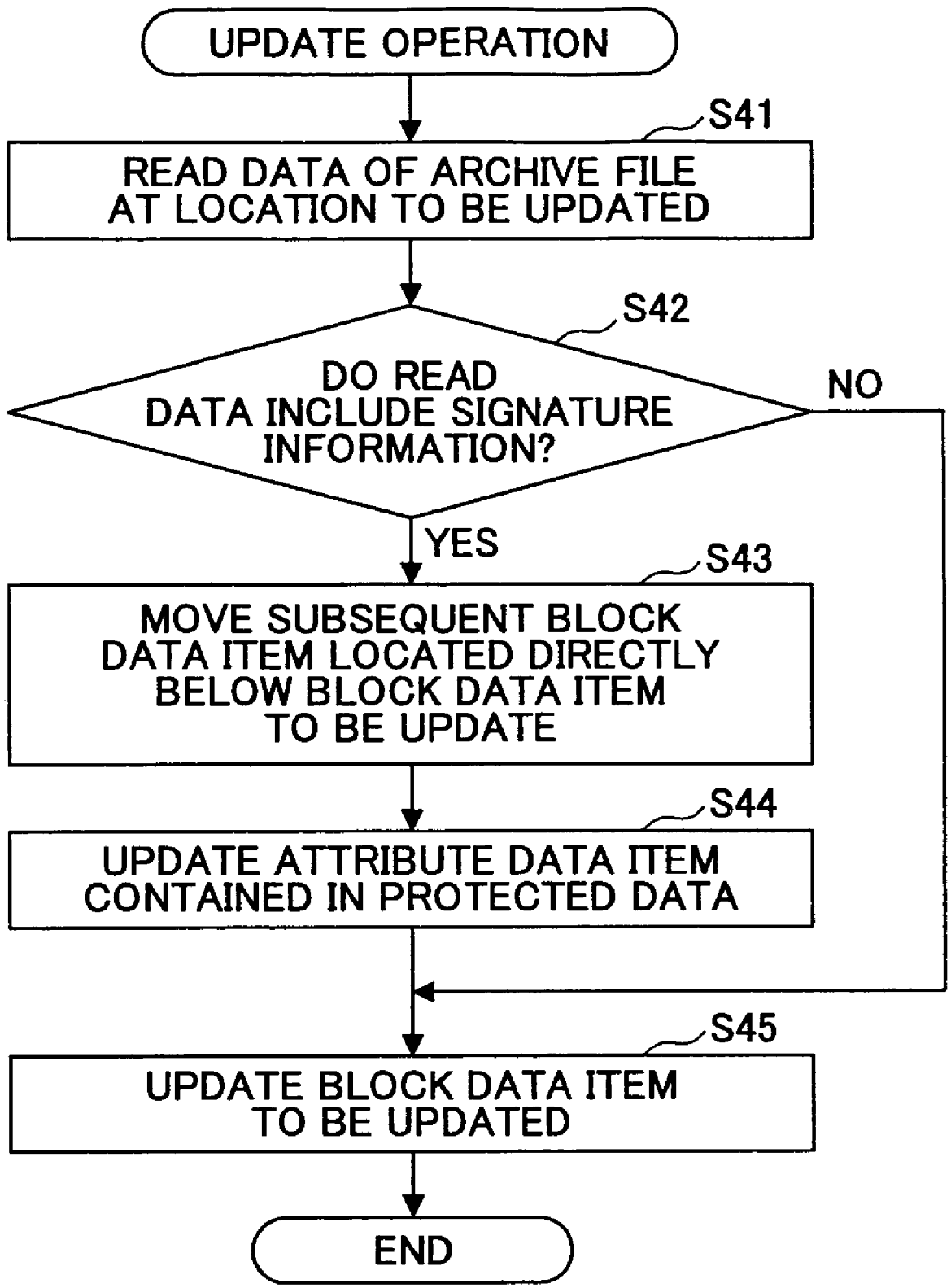
FIG. 19 is a flowchart illustrating another update operation.

The update operation of step S23 is described below with reference to a flowchart shown in FIG. 18. As shown in FIG. 18, the sizes of the block data item before and after the update are calculated (steps S31, S32), so the sizes before and after the update are compared (step S33). If the size of the block data item after the update is larger (step S33: Yes), a subsequent block data item directly below the block data item to be updated is moved into the temporary storage part (step S34). Then, in the CEN data item corresponding to the subsequent block data item, an attribute data item indicating the storage location of the block data item is updated so as to indicate the storage location of the subsequent block data item held in the temporary storage part (step S35), and the update operation for the block data item to be updated is executed (step S36). If, otherwise, the size of the block data item after the update is smaller (step S33: No), the update operation for the block data item to be updated is executed (step S36), skipping steps S34 and S35.

In a case where the size of the block data item after the update is larger than the total size of the block data item before the update and the subsequent block data item directly below the block data item to be updated, block data items below the subsequent block data item may be moved into the temporary storage part in step S34 instead of moving only the subsequent block data item directly below the block data item to be updated. In this case, in each of the CEN data items corresponding to the moved block data items, an attribute data item indicating the storage location of the block data item is updated so as to indicate the storage location in the temporary storage part.

The execution of the protection operation of the subsequent block data item is determined based on the comparison of the sizes of the block data item before and after the update in the above example. Alternatively, with use of signature information as an identification of a LOC data item that is stored at the top of the block data item, the protection operation of the subsequent block data item may be executed upon detection of the signature information as an identification of the subsequent block data item by reading data to be overwritten with an update block data item in the update operation.

The following is another update operation based on the above-described alternative method in step S23. With reference to a flowchart shown in FIG. 19, data of the archive file at the location to be updated by the update block data item are read (step S41). Then, it is determined whether the read data include signature information indicating a top location (LOC data item) of the subsequent block data (step S42). If it is determined that the data include the signature information (step S42: Yes), the subsequent block data item directly below the block data item to be updated is moved into the temporary storage part (step S43). Then, in the CEN data item corresponding to the subsequent block data item, an attribute data item indicating the storage location of the block data item is updated so as to indicate the storage location of the subsequent block data item held in the temporary storage part (step S44), and the update operation for the block data item to be updated is executed (step S45). If, otherwise, it is determined that the data do not include the signature information (step S42: No), the update operation for the block data item to be updated is executed (step S45), skipping steps S43 and S44. By repeating the above steps, the update operation can be executed after reading signature information and determining whether information in a subsequent block data item is destroyed.

Figure 20:
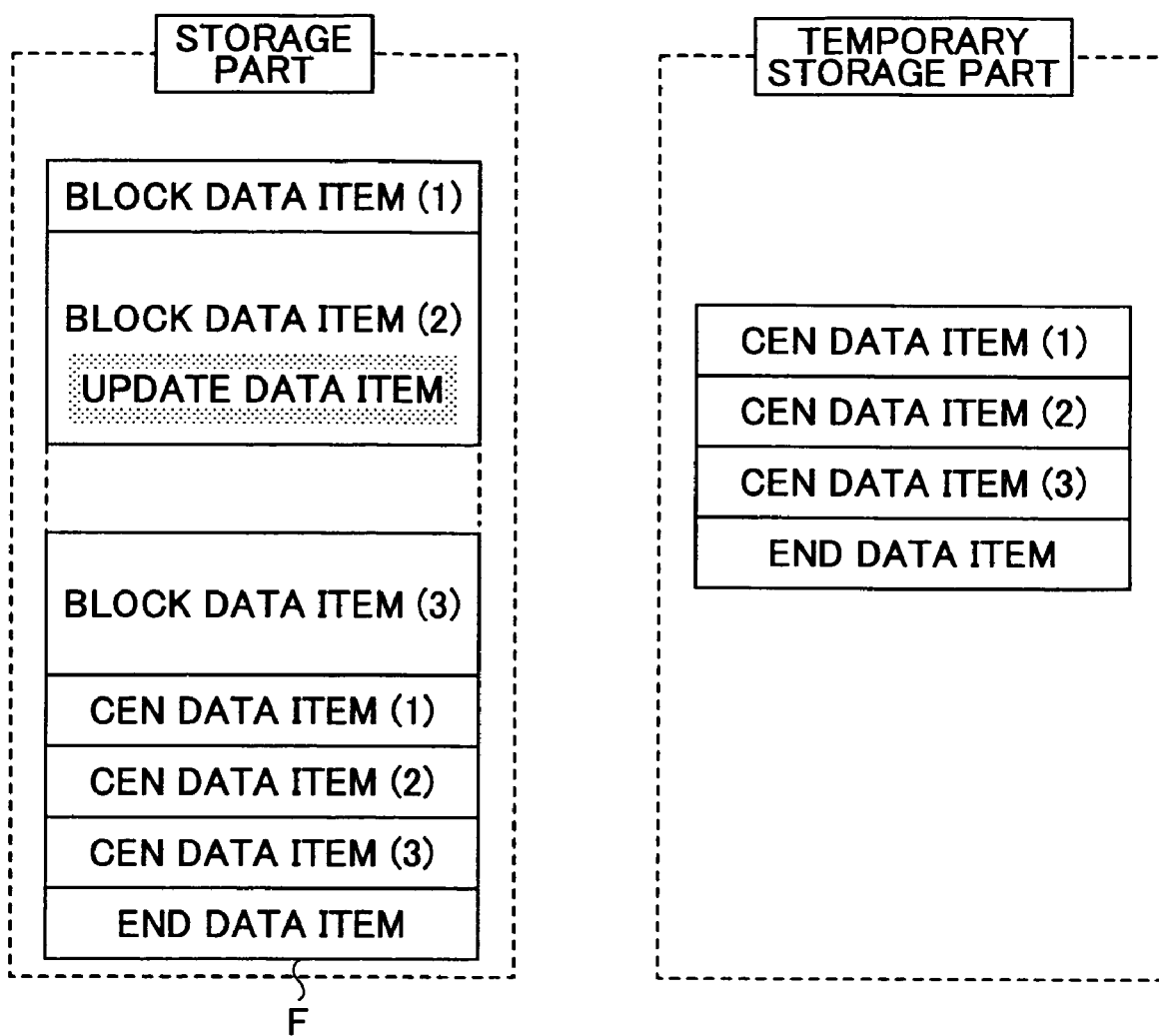
FIG. 20 shows the data of the archive file in the storage part and the temporary storage part on completion of another step.

FIG. 20 shows the data of the archive file F in the storage part and the temporary part on completion of step S23.

In step S24 of FIG. 15, the size of the block data item after the update is calculated to be compared with the size of the block data item before the update. With this compare operation, the difference between the sizes of the block data item (compression sizes) before and after the update is calculated. The size of the block data item before the update used in the compare operation may be acquired by referring to attribute information in the protected data temporarily protected by the temporary storage part, or may be acquired by calculating the data size before updating the block data item in advance. The size of the block data item after the update may be acquired by calculating the size of the block data item in the archive file held in the storage part after the update, or may be acquired by calculating the size of the update block data item upon the write operation.

Figure 21:
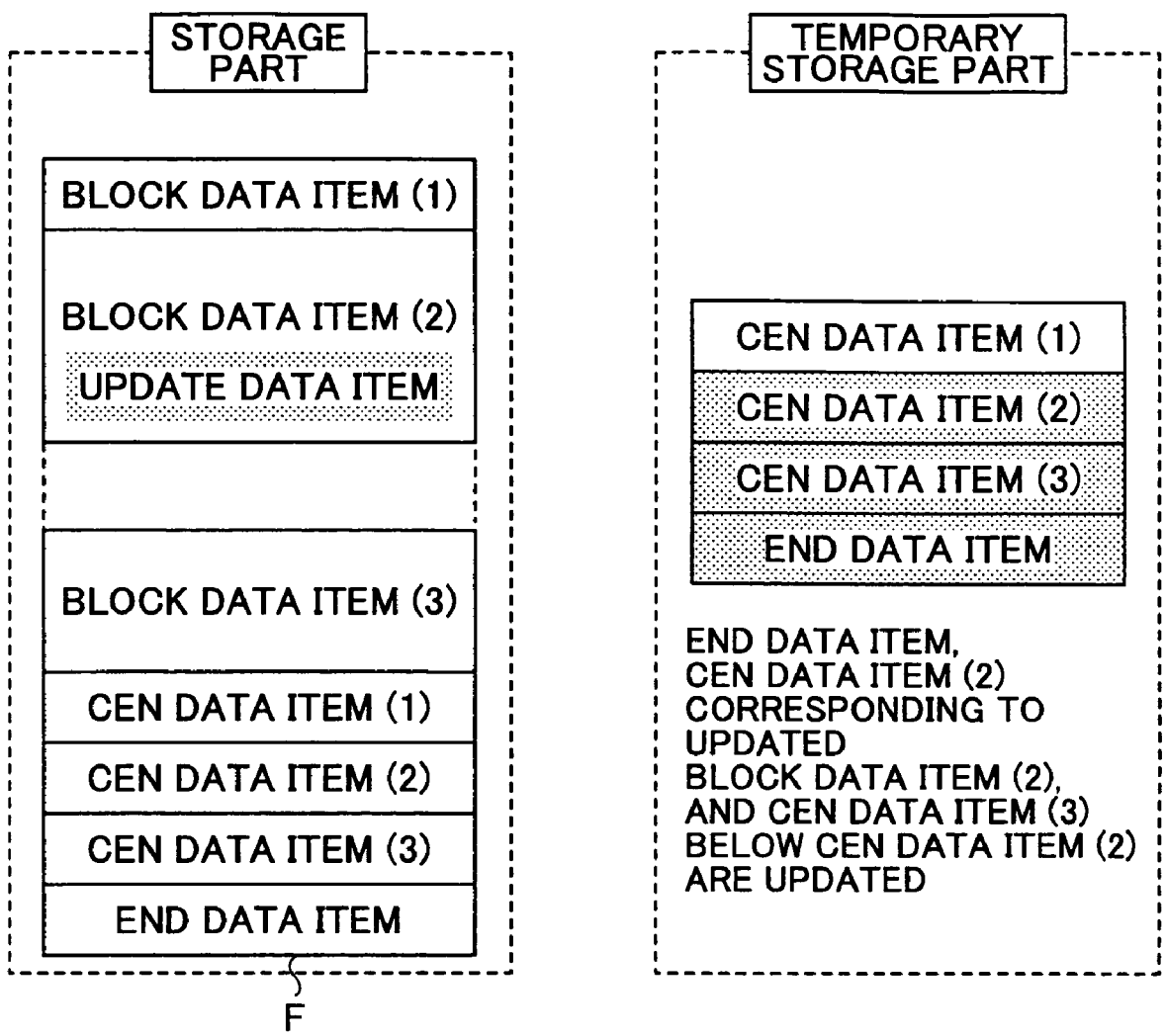
FIG. 21 shows the data of the archive file in the storage part and the temporary storage part on completion of another step.

In step S25, the attribute data items contained in the protected data protected in the temporary storage part are updated according to information about the calculated difference of the block data item size (second updating part). The attribute data items to be updated herein include the END data item and the CEN data items. For example, if the size increase is X bytes according to the block data item size difference information, the value of the attribute data item in the END data item indicating the storage location of the top CEN data item is updated by adding X bytes to the value of the attribute data item of step S22 existing before the block data item update operation. If one or more new files are added to the archive file F in the update operation of step S23, a value corresponding to the number of added files is added to the value of the attribute data item in the END data indicating the total number of the CEN data items. As for the CEN data items, the CEN data item corresponding to the updated block data item and the CEN data items therebelow are updated. In the CEN data item corresponding to the updated block data item, attribute information indicating the size of the corresponding block data item is changed so as to indicate the size of the updated block data item. If a file name or the like is updated in the update operation of step S23, attribute information indicating the file name length and attribute information indicating the file name are also updated. In the CEN data item below the updated CEN data item, the value of the attribute data item indicating the storage location of the corresponding block data item is updated by adding X bytes to the value of the attribute data item of step S22 existing before the block data item update operation. FIG. 21 shows the data of the archive file F in the storage part and the temporary storage part on completion of step S25.

Finally, in step S26, the attribute data items in the archive file F held in the storage part are overwritten with the attribute data items, i.e., the protected data (second writing part).

In this step, if the size of the updated block data item is increased compared to the size before the update, the block data item moved into the temporary storage part for protection is written over the corresponding block data item in the archive file F. Then, in the corresponding CEN data item, an attribute data item indicating the storage location of the block data item is updated so as to indicate the storage location in the archive file F. If, otherwise, the size of the updated block data item is reduced compared to the size before the update, locations of the block data items below the updated block data items may be moved forward in accordance with the size difference.

Figure 22:
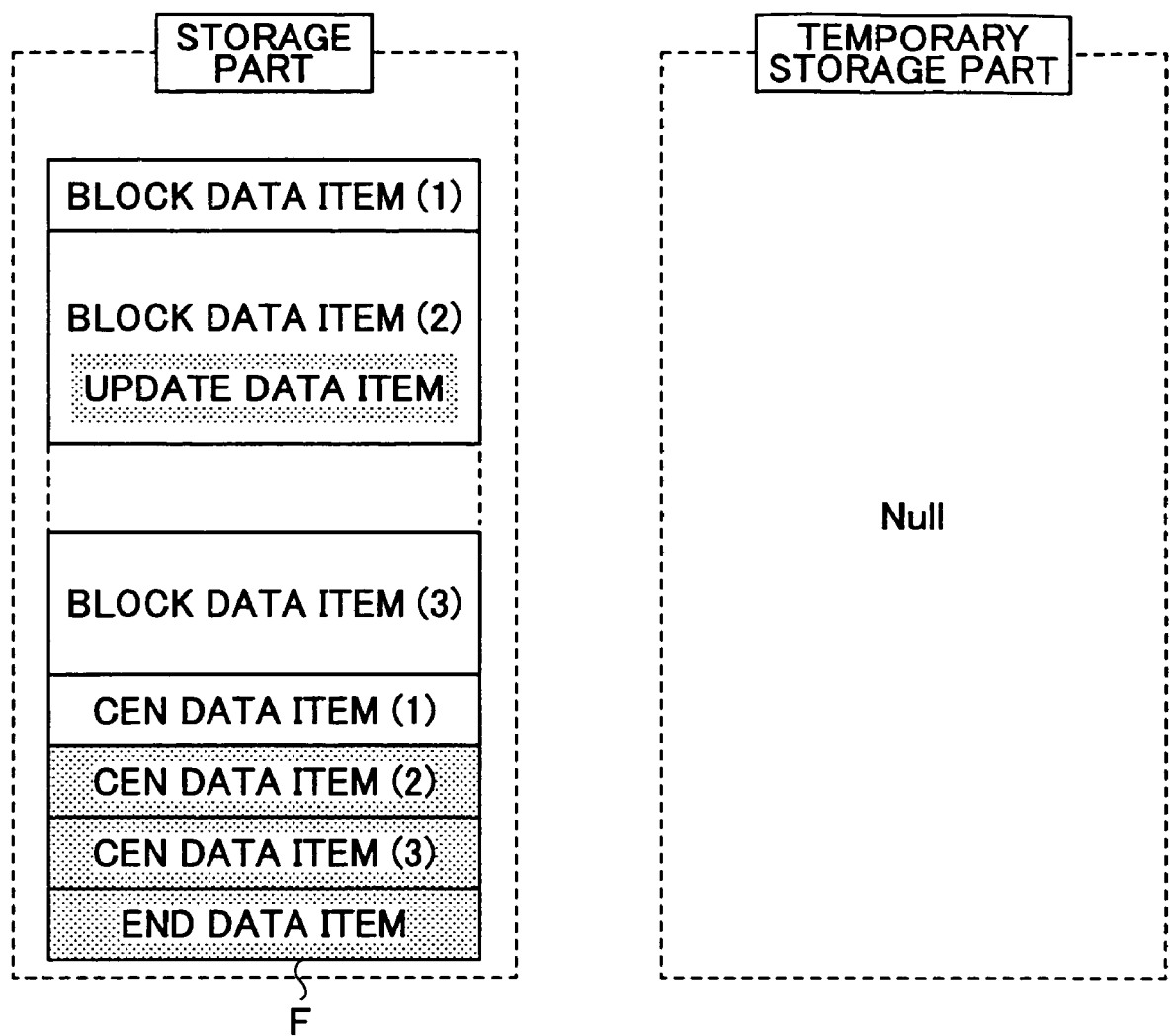
FIG. 22 shows the data of the archive file in the storage part and the temporary storage part on completion of another step.

If the attribute data item of the update execution flag is included in the END data item contained in the archive file F, the update execution flag is updated to "False" to indicate completion of the update operation of the archive file F. FIG. 22 shows data of the archive file F in the storage part and the temporary storage part on completion of step S26.

With the above described operations, data in the archive file format being updated can be protected even if an information processing apparatus having a temporary storage part with a small storage capacity is used. The read operation of the archive file F is the same as in the first embodiment, and a desired block data item in the archive file being updated can be directly read even if an information processing apparatus having a temporary storage part with a small storage capacity is used.

According to this embodiment, attribute data items in the archive file F specified by the update instructing part are moved into the temporary storage part for protection by the information protecting part 24 before the update operation of the archive file F. Then, predetermined contents in the protected data items are updated in accordance with the update of the block data item contained in the archive file F. The protected data items with the predetermined contents updated are written into the archive file F containing the updated block data item. Therefore, even if a desired block data item contained in the archive file F is directly updated, the block data items contained in the archive file F can be kept readable without destroying the archive file format. That is, the archive file F can be updated while protecting the date in the archive file format.

It should be understood that the present invention is not limited to the specifically disclosed embodiment, and variations and modifications may be made without departing from the scope of the present invention.

Third Embodiment

A third embodiment of the present invention is described with reference to FIGS. 23 through 30. Elements identical to those in the first embodiment bear the same reference numbers and are not further described. More specifically, while the data items in the archive file F below the block data item to be updated are moved into the temporary storage part in the update operation of the archive file F so as to protect data in the archive file format in the first embodiment, the archive file is separated at a storage position at the end of the block data item to be updated so as to protect data in the archive file format in this embodiment.

[1. Unique Features of Computer 1]

Figure 23:
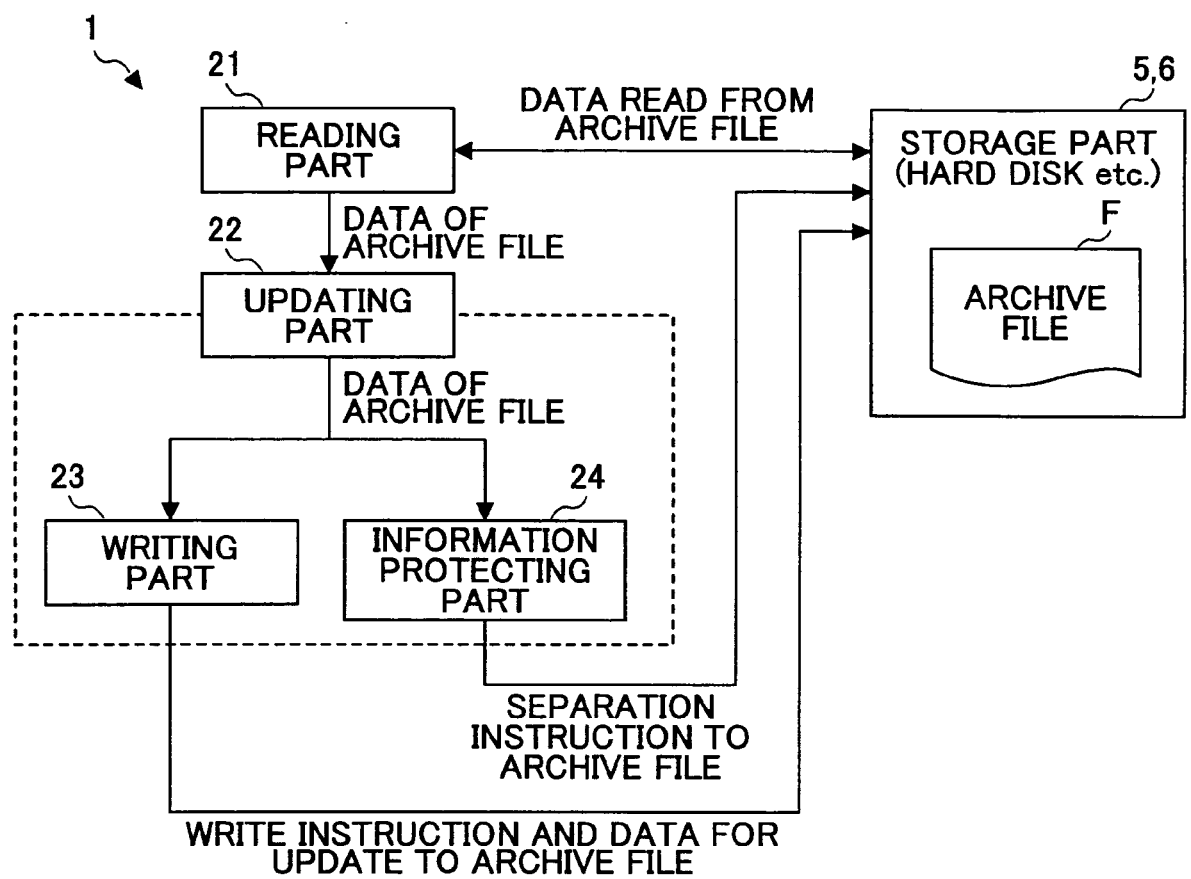
FIG. 23 is a functional block diagram of a computer according to a third embodiment of the present invention.

FIG. 23 is a functional block diagram of the computer 1 according to this embodiment. With reference to FIG. 23, the computer 1 provides a reading part 21 and an updating part 22 in accordance with an application program being executed on an operating system by a CPU 2. In FIG. 23, a storage part for holding data such as an archive file F corresponds to the HDD 5 or the removable medium 6.

The reading part 21 is configured to read a data file or an archive file F held in the storage part.

The updating part 22 is configured to directly update a desired block data item in the archive file F. The updating part 22 includes a writing part 23 and an information protecting part 24. The writing part 23 is configured to directly write an update data item into the archive file F held in the storage part. When data are directly written into the archive file F, the archive file format is destroyed. In order to protect the archive file format, the information protecting part 24 separates and protects data contained in the archive file F before the format is destroyed, thereby protecting the data in the archive file F.

[1-1. Archive File Update Operation]

Figure 24:
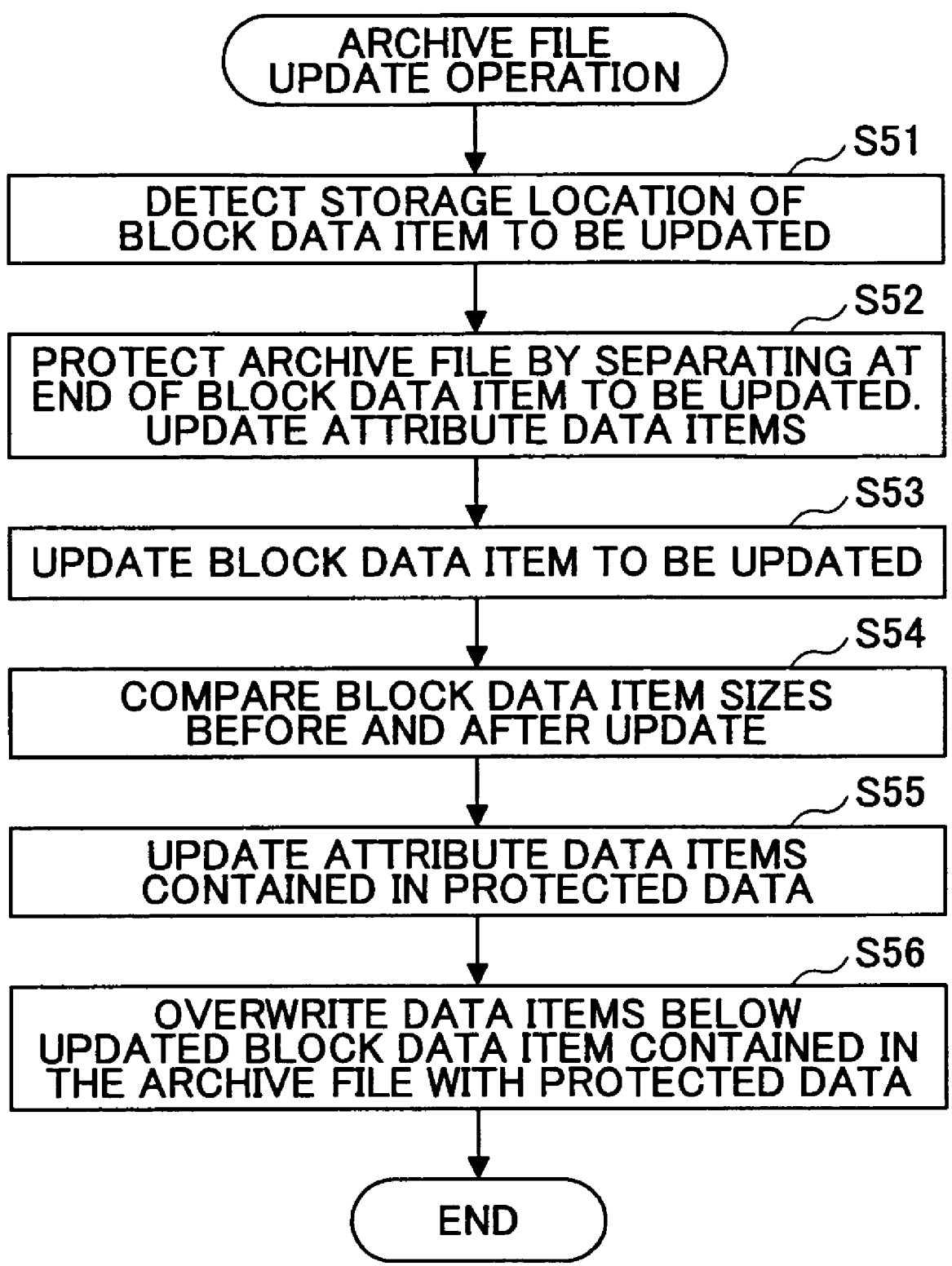
FIG. 24 is a flowchart illustrating an archive file update operation.
Figure 25:
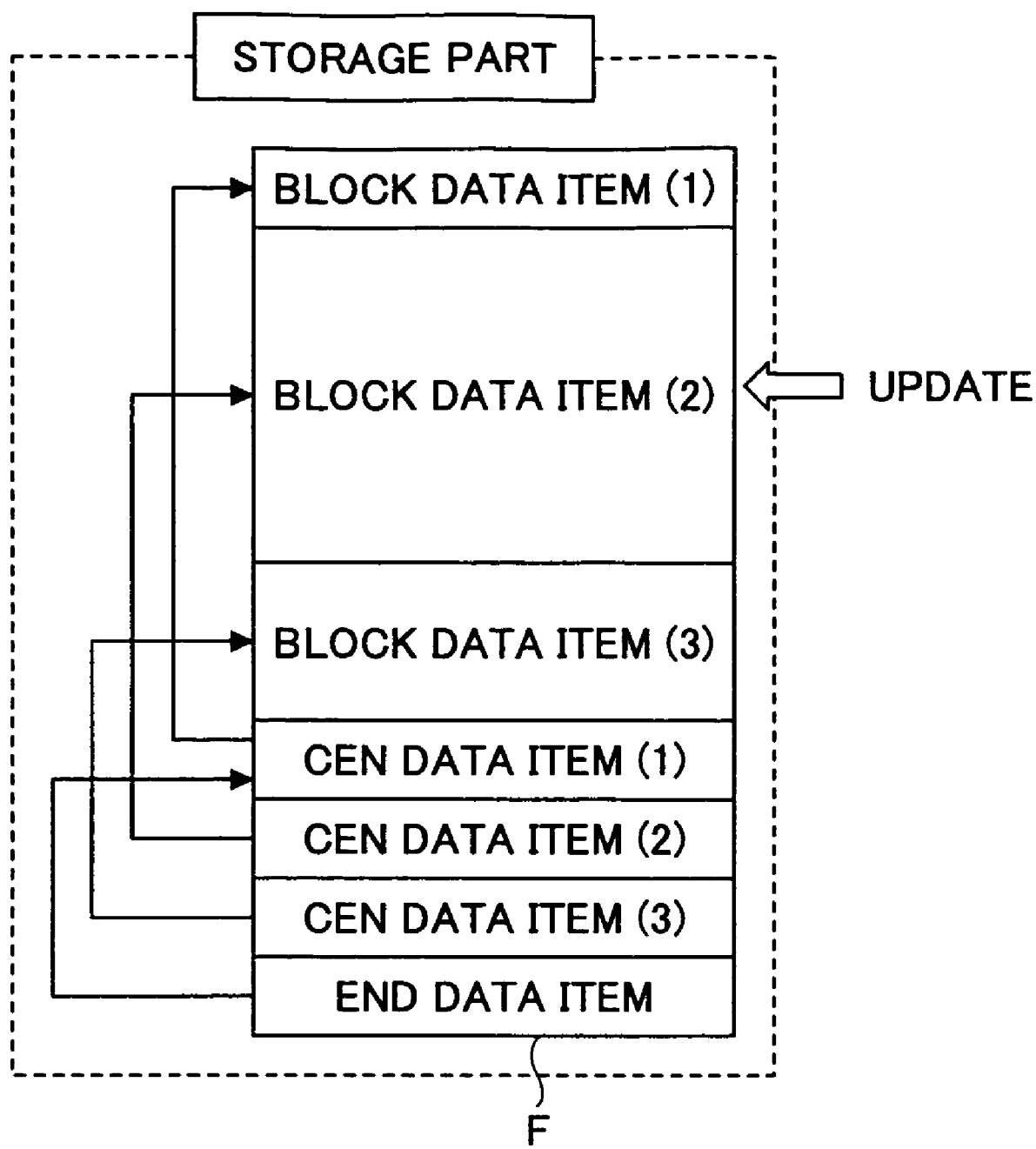
FIG. 25 shows data of an archive file in a storage part on completion of one step.

This section describes an archive file update operation performed by the updating part 22 in detail. FIG. 24 is a flowchart illustrating the archive file update operation. With reference to FIG. 24, in the archive file update operation, the storage location of a block data item to be updated is detected by reading the archive file F held in the storage part (HDD 5 or removable medium 6) (step S51: update instructing part). For detecting the storage location of the block data item to be updated, the storage location of an END data item is detected based on signatures contained in the archive file F. In the thus detected END data item, an attribute data item indicating the storage location of a CEN data item is referred to so as to read the CEN data item. In the CEN data item, an attribute data item indicating the storage location of the block data item is referred to so as to detect the storage location of the block data item to be updated. FIG. 25 shows data of the archive file F in the storage part on completion of step S51.

Figure 26:
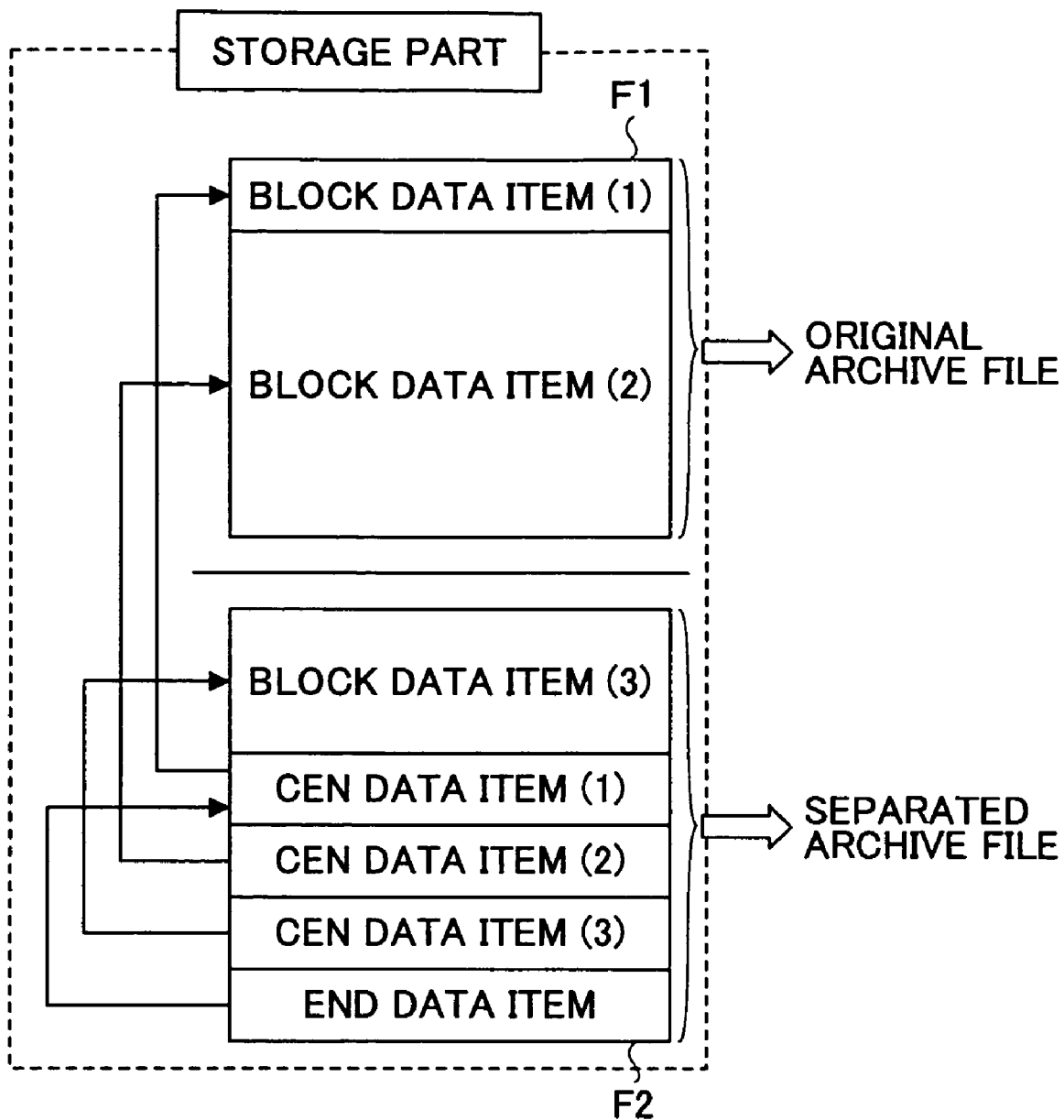
FIG. 26 shows the data of the archive file in the storage part on completion of another step.

In step S52, the archive file F is separated at the storage location of the end of the block data item detected in step S51 into archive files F1 and F2 so as to protect data in the archive file format, and attribute data items in the protected data are updated. The attribute data items to be updated herein include the END data item, and the CEN data items corresponding to the block data items located below the block data item to be updated. In the END data item, an attribute data item indicating the storage location of a top CEN data item is updated so as to indicate the storage location of the top CEN data item contained in the archive file F2. In the CEN data item to be updated herein, an attribute data item indicating the storage location of the block data item is updated so as to indicate the storage location of the corresponding block data item contained in the archive file F2. FIG. 26 shows the data of the archive file F (archive files F1 and F2) in the storage part on completion of step S52.

Figure 27:
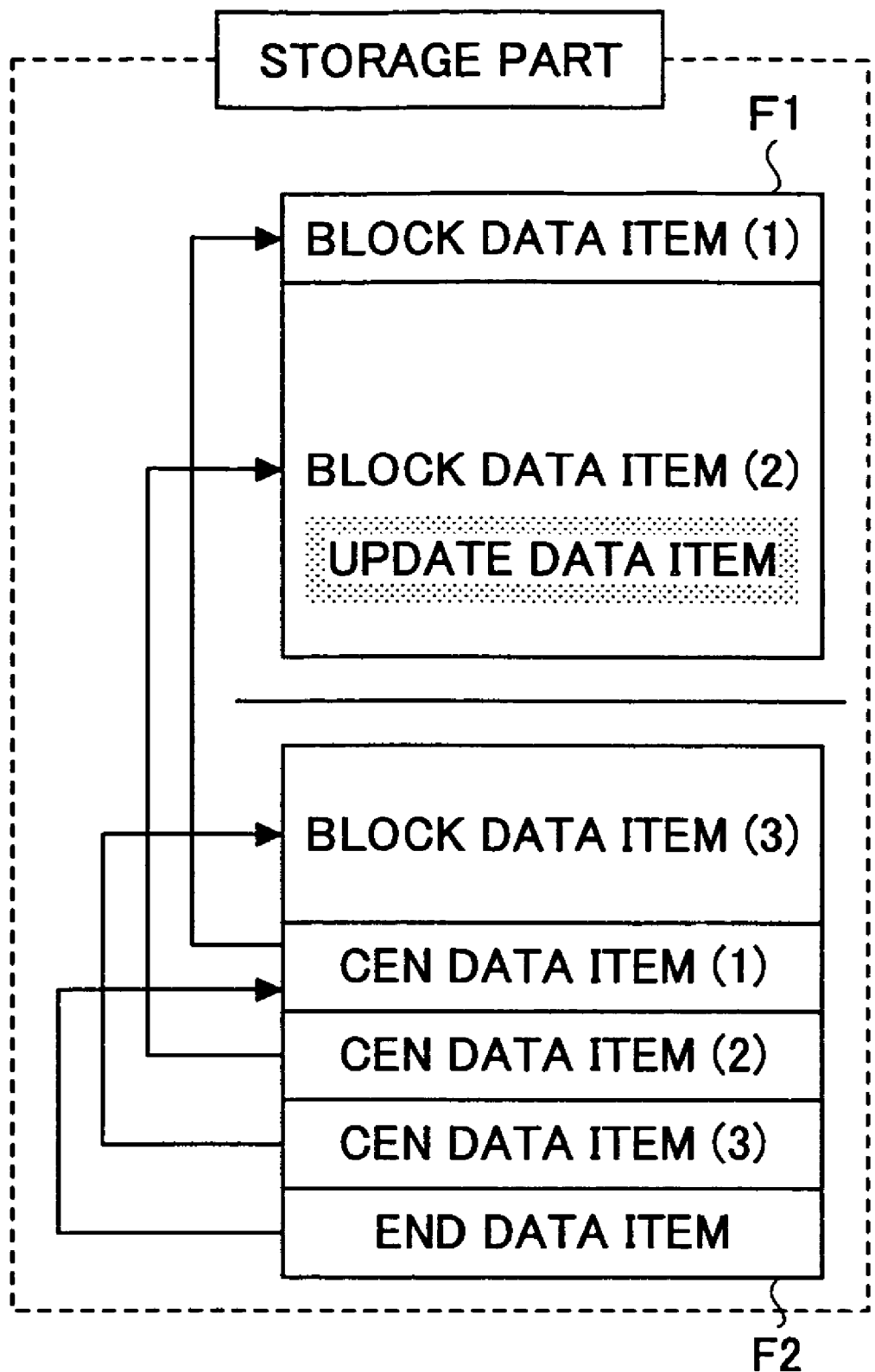
FIG. 27 shows the data of the archive file in the storage part on completion of another step.

In step S53, an update operation is carried out by writing an update block data item into the block data item to be updated in the archive file F (archive file F1) held in the storage part. In the write operation, for example, the block data item to be updated may be decompressed to be inversely converted into file data (reading part), so the file data are updated (first updating part). Then, the updated file data are compressed again to be converted into a block data item. This updated block data item is written into the storage location of the block data item to be updated in the archive file F (archive file F1) (first writing part). The archive file format is destroyed due to a size change of the updated block data item upon this write operation. Therefore, if an update operation is performed without protecting the data in the archive file F, the data in the archive file F cannot be read any more. FIG. 27 shows the data of the archive file F (archive files F1 and F2) in the storage part on completion of step S53.

In step S54, the size of the block data item after the update is calculated to be compared with the size of the block data item before the update. With this compare operation, the difference between the sizes of the block data item (compression sizes) before and after the update is calculated. The size of the block data item before the update used in the compare operation is acquired by calculating the data size before updating the block data item in advance. The size of the block data item after the update may be acquired by calculating the size of the block data item in the archive file held in the storage part after the update, or may be acquired by calculating the size of the update block data item upon the write operation.

Figure 28:
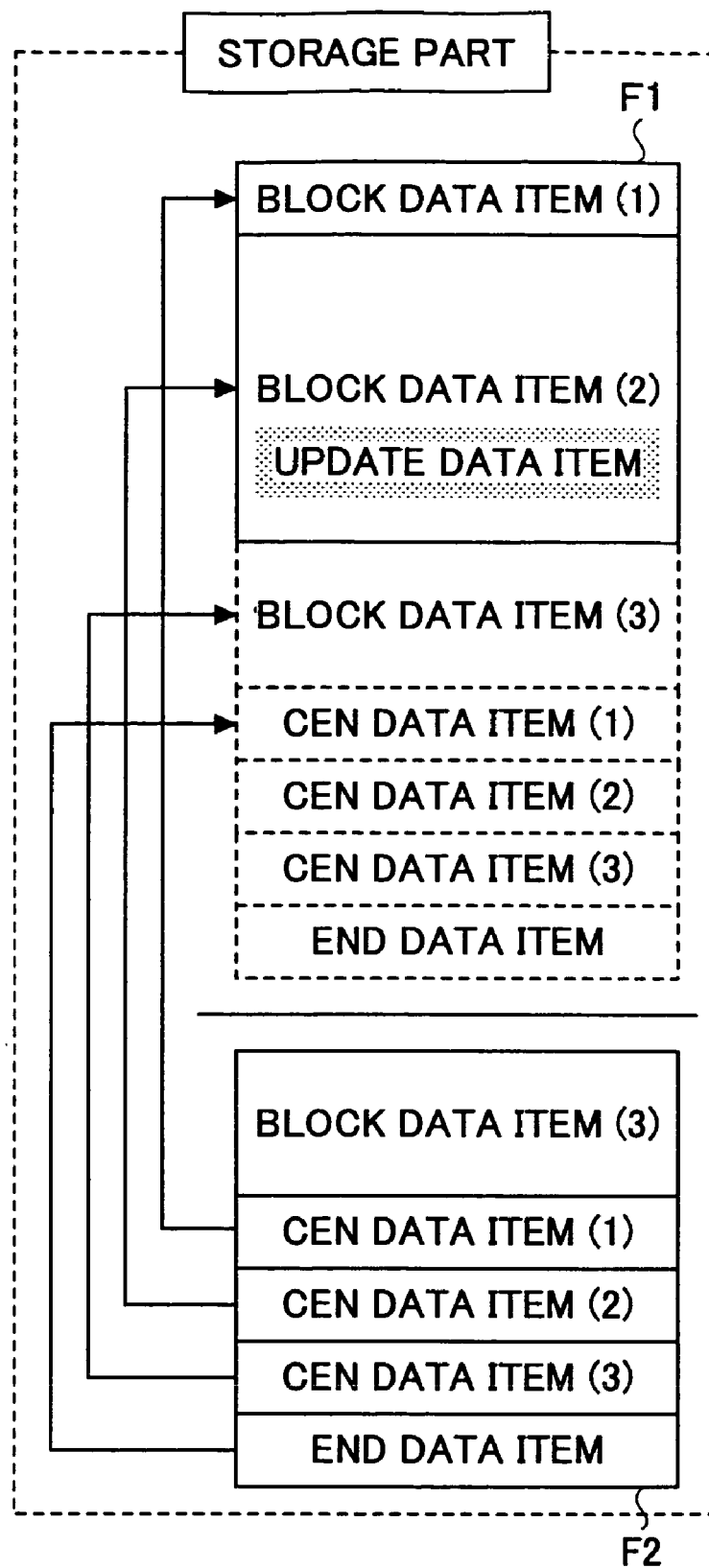
FIG. 28 shows the data of the archive file in the storage part on completion of another step.

In step S55, the attribute data items contained in the separated archive file F (archive file F2) are updated according to information about the calculated difference of the block data item size (second updating part). The attribute data items to be updated herein include the END data item and the CEN data items. For example, if the size increase is X byte according to the block data item size difference information, the value of the attribute data item in the END data item indicating the storage location of the top CEN data item is updated by adding X bytes to the value of the attribute data item of step S52 before the block data item update operation. As for the CEN data items, the CEN data item corresponding to the updated block data item and the CEN data item therebelow are updated. In the CEN data item corresponding to the updated block data item, attribute information indicating the size of the corresponding block data item is changed so as to indicate the size of the updated block data item. In the CEN data item below the updated CEN data item, the value of the attribute data item indicating the storage location of the corresponding block data item is updated by adding X bytes to the value of the attribute data item of step S52 before the block data item update operation. FIG. 28 shows the data of the archive file F (archive files F1 and F2) in the storage part on completion of step S55.

Figure 29:
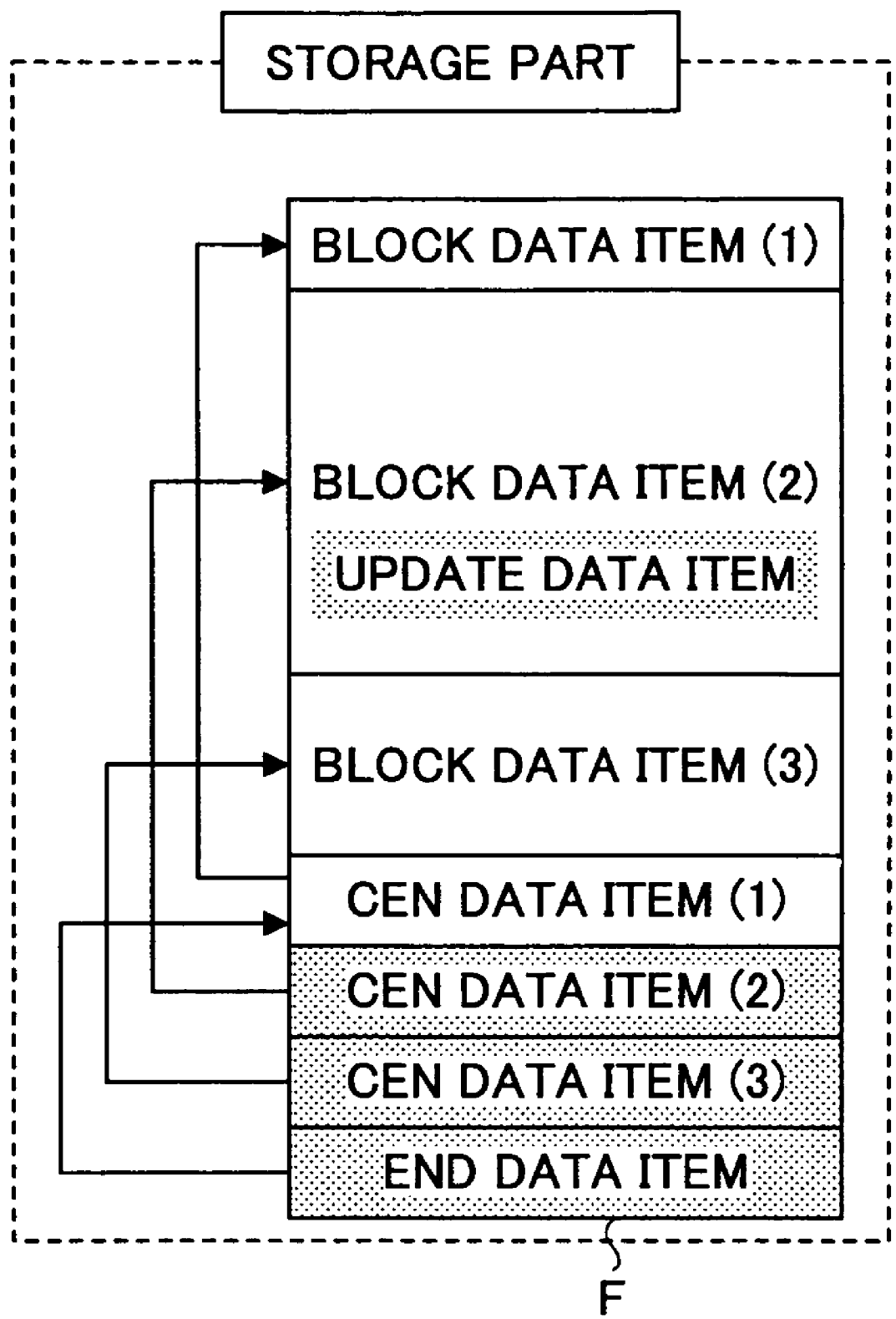
FIG. 29 shows the data of the archive file in the storage part on completion of another step.

Finally, in step S56, the data items below the updated block data item in the original archive file F (archive file F1) are overwritten with the archive file F2 separated as protected data (second writing part). FIG. 29 shows the data of the archive file F in the storage part on completion of step S56.

With the above-described operations, even when an arbitrary block data item contained in the archive file F is directly updated, the block data items contained in the archive file F can be kept readable. Thus, the data in the archive file format can be protected.

[1-2. File Read Operation in Archive File Update Operation]

Figure 30:
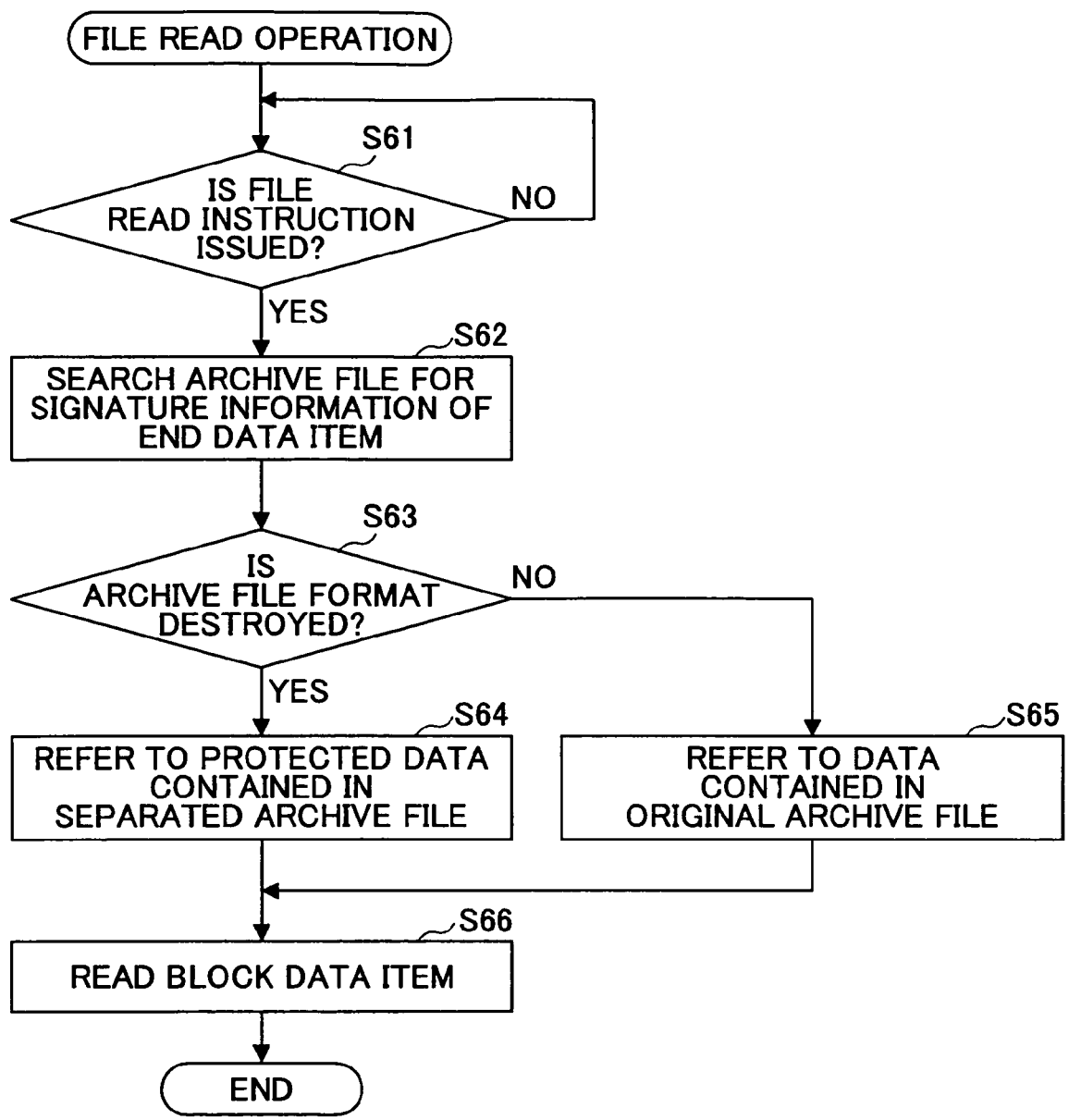
FIG. 30 is a flowchart illustrating a file read operation in an archive file update operation.

This section describes a file read operation performed by the reading part and the updating part 22 in an archive file update operation in detail. FIG. 30 is a flowchart illustrating a file read operation in an archive file update operation. With reference to FIG. 30, if an file read instruction is issued in an archive file update operation (step S61: Yes), signature information as an identification of the END data item is searched for in the archive file F held in the storage part (step S62).

In step S63, it is determined whether the archive file format searched for in step S62 is destroyed, that is, whether the update operation is being executed. The determination is made based on the presence or absence of the signature information as an identification of the END data item in the archive file F. If the signature information as an identification of the END data item is detected by the search in step S62, the archive file F is not being updated. Therefore, the archive file format is determined as not destroyed (step S63: No), and the processing proceeds to step S65. If, otherwise, the signature information is not detected, the archive file is being updated. Therefore, the archive file format is determined as destroyed (step S63: Yes), and the processing proceeds to step S64.

In step S64, the protected data in the separated archive file F2 are referred to. The protected data are the data of the archive file F generated by separating the archive file F in step S52 in the flowchart of the archive file update operation shown in FIG. 24. In the END data item protected as the protected, an attribute data item indicating the storage location of the top CEN data item is referred to so as to refer to the CEN data item. In the CEN data item, information about the storage location of the block data item is referred to so as to specify the storage location of the block data item to be read. Then, the processing proceeds to step S66.

In step S65, the data in the original archive file F (archive file F1) are referred to. Step S65 is the same as a conventional read operation of the archive file F. That is, the END data item in the original archive file F (archive file F1) is referred to, and then the CEN data item is referred to. Thus, the storage location of the block data item to be read is specified, and the processing proceeds to step S66.

Finally, in step S66, the block data item at the storage location specified in step S64 or step S65 is read.

With the above-described operations, as a desired block data item in the archive file format F can be directly read even if the archive file F in the archive file format is being updated, the convenience of the archive file format is improved.

According to this embodiment, the information protecting part 24 separates the archive file F at the location of a desired block data item specified by the update instructing part before the update operation of the archive file F. Then, predetermined contents in the protected data items are updated in accordance with the update of the block data item contained in the archive file F. The protected data items with the predetermined contents updated are written into the archive file F containing the updated block data item. Therefore, even if a desired block data item contained in the archive file F is directly updated, the block data items contained in the archive file F can be kept readable without destroying the archive file format. That is, the archive file F can be updated while protecting the data in the archive file format.

It should be understood that the present invention is not limited to the specifically disclosed embodiment, and variations and modifications may be made without departing from the scope of the present invention.

Fourth Embodiment

A fourth embodiment of the present invention is described with reference to FIGS. 31 through 43. Elements identical to those in the first through third embodiments bear the same reference numbers and are not further described. In this embodiment, an encapsulated document is used as an archive file.

[1. Overview of Encapsulated Document]

Figure 31:
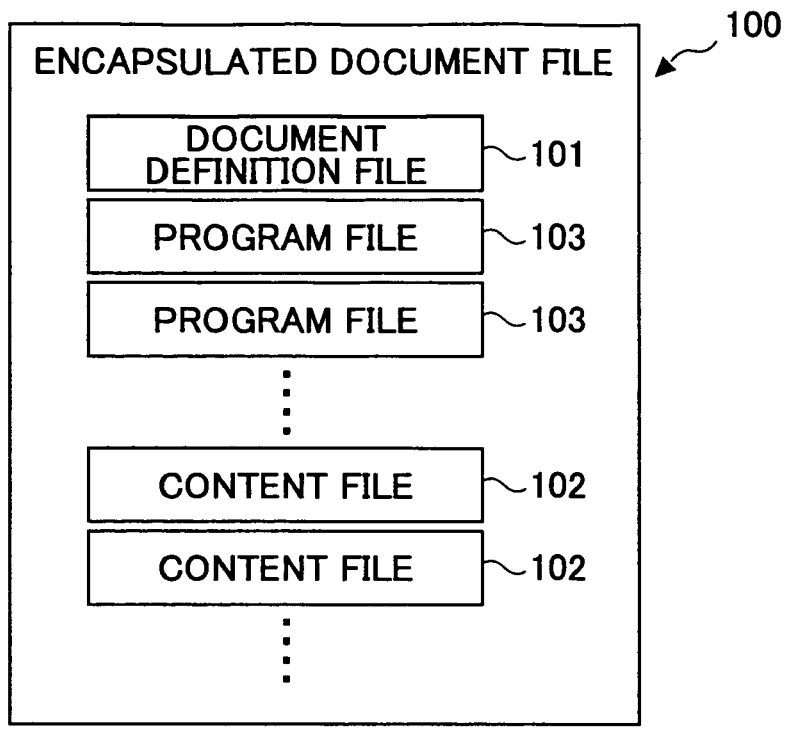
FIG. 31 is a schematic diagram illustrating a structure of an encapsulated document file as an archive file according to a fourth embodiment of the present invention.

The following provides an overview of a data structure of a document (encapsulated document structure). FIG. 31 is a schematic diagram illustrating a structure of an encapsulated document file 100 as an archive file according to the present invention. The encapsulated document file 100 is held in the HDD 5 or the removable medium 6. The encapsulated document file 100 of this embodiment is created by encapsulating a definition file 101 including definitions of the encapsulated document, content files 102 including contents to be materialized on the document, and program files 103 including operations programs for materializing (display, activate, read, etc.) the contents into a single file with use of an encapsulating part. Such information contained in the file 101 through 103 has a file structure that can be managed by an operating system of the typical computer 1. Accordingly, because the program files 103 for materializing the content files 102 are encapsulated with the content files 102, the document file can be read even in a computer environment different from that of a creator of the document file 100.

For example, content information of the content files 102 include still images, moving images, sound, and text files, which are formed as files in accordance with file formats usable and operable by the computer 1. The operations programs of the program files 103 are preferably written in intermediate language codes. This is because if the operations programs are written in intermediate language codes, the program is operable regardless of the type of the computer as long as a compiler or an interpreter program capable of compiling or interpreting, respectively, the language is installed in the computer. One example of an intermediate language is Java (registered trademark of Sun Microsystems).

Figure 32:
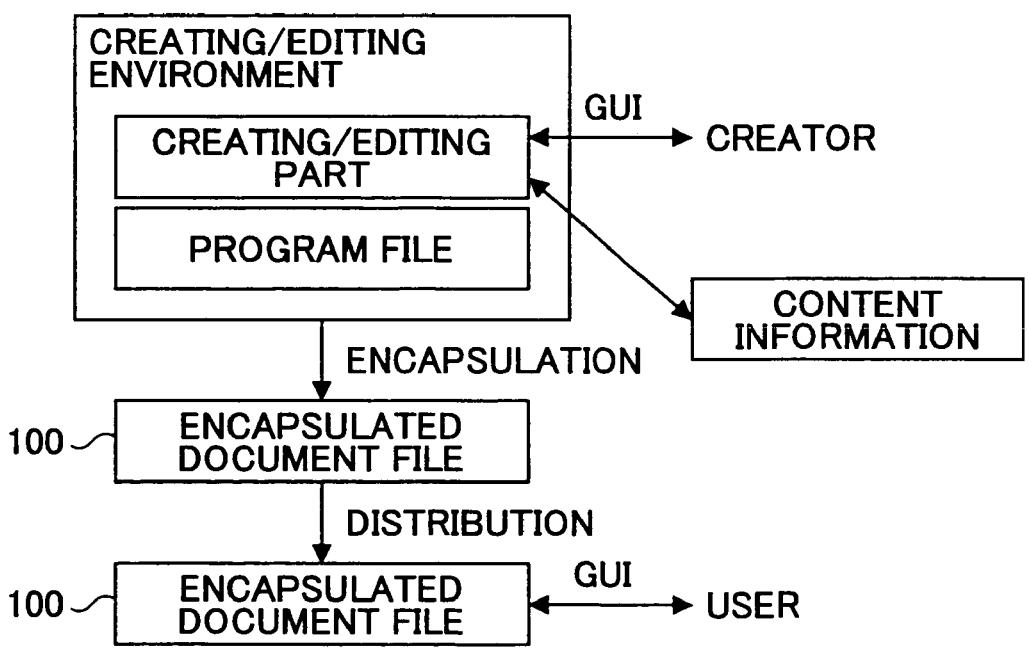
FIG. 32 is a block diagram illustrating a creating/editing environment of an encapsulated document file.

FIG. 32 is a block diagram illustrating a creating/editing environment of the encapsulated document file 100. For creating and editing the encapsulated document file 100, a creator creates a document using a GUI (Graphical User Interface) offered by an editing environment (editing application program). Desired external contents may be inserted into the document. Content information created by the above-described editing operations and document definition information are converted into the content files 102 and the document definition file 101, respectively. Then, the program files 103 to be encapsulated into the encapsulated document file 100 are selected from program files contained in the creating/editing environment, so the files 101 through 103 are encapsulated as the encapsulated document file 100. In this embodiment, plural files are encapsulated in an archive file format such as ZIP and LHA, although the files may be encapsulated in other ways. When the encapsulated document file 100 into which the plural files are encapsulated is distributed, the encapsulated document can be read regardless of a reading environment at a distributed side because a program for displaying and activating the document contents is encapsulated together with the document contents.

[2. Encapsulated Document File Update Operation]

In communications between people through multimedia information, it is desired to update multimedia information by adding annotations to have better communications. For updating multimedia information transmitted using encapsulated document file 100 in the archive file format, block data items in the archive file need to be updated. A conventional method for updating the archive file decompresses all the block data items in the archive file before updating, although it allows directly reading a desired block data item in the archive file. Therefore, even if only some block data items need to be updated, a long processing time is required.

In the case wherein the encapsulated document is used as the archive file, if the update methods described in the first through third embodiments are applied to the update operation of the encapsulated document file, it becomes possible to directly update multimedia information contained in the encapsulated file and therefore reduce the update operation time.

Figure 33:
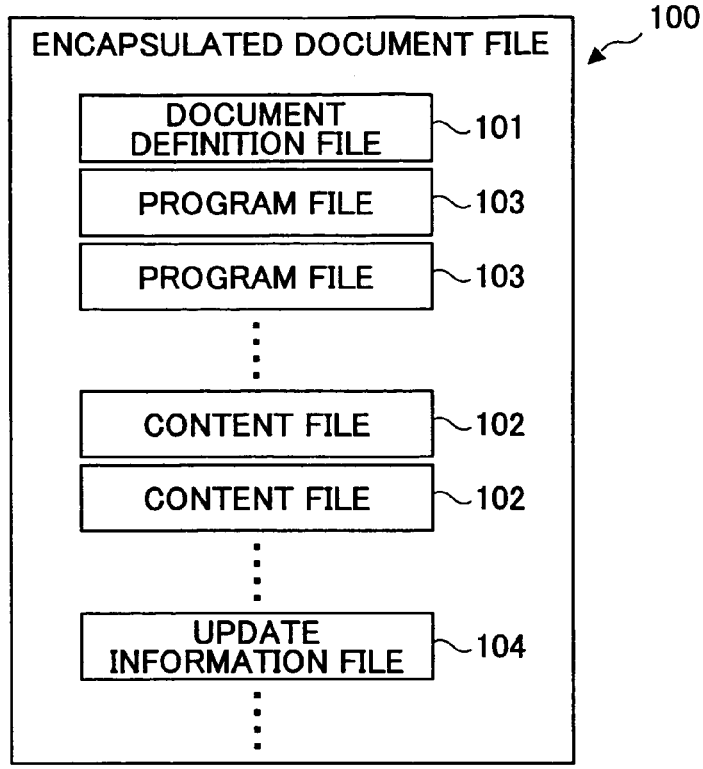
FIG. 33 is a schematic diagram illustrating another structure of an encapsulated document file.
Figure 34:
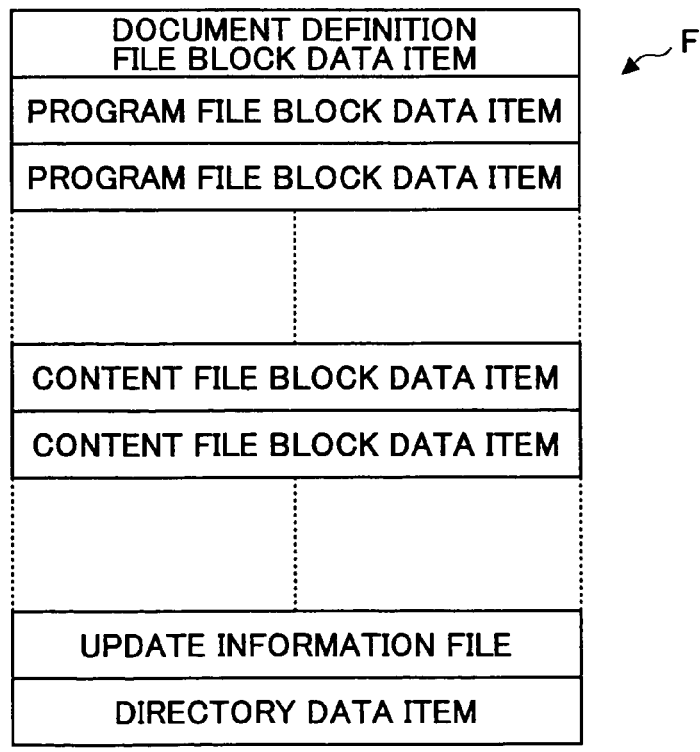
FIG. 34 is a schematic diagram illustrating a structure of an encapsulated document file in an archive file format.
Figure 35:
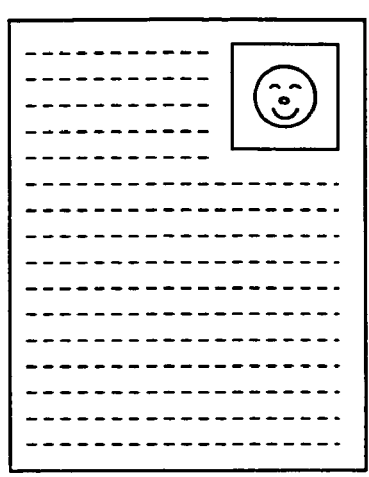
FIG. 35 illustrates a screen on which a document distributed as an encapsulated document file is displayed.
Figure 36:
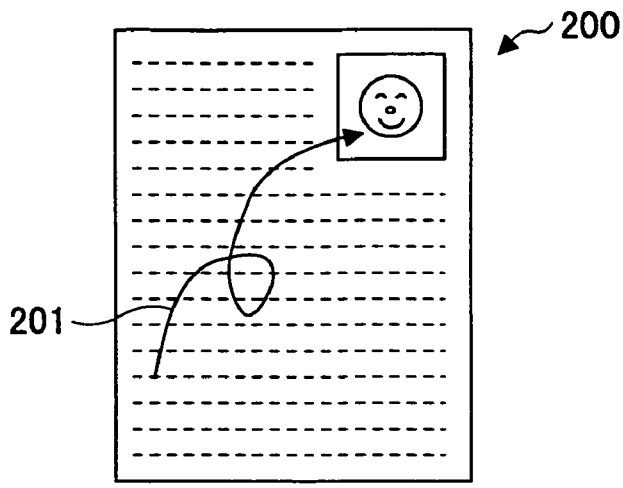
FIG. 36 illustrates a screen on which a document with additional information added thereto is displayed.

As additional information among annotation information is likely to have frequent updates, the additional information may be separately held as an update information file 104 in the encapsulated document file 100 as shown in FIG. 33. If the update methods described in the first through third embodiments are applied to the encapsulated document file having such a structure, information is held as block data items as shown in FIG. 34 in the archive file F.

Figure 37:
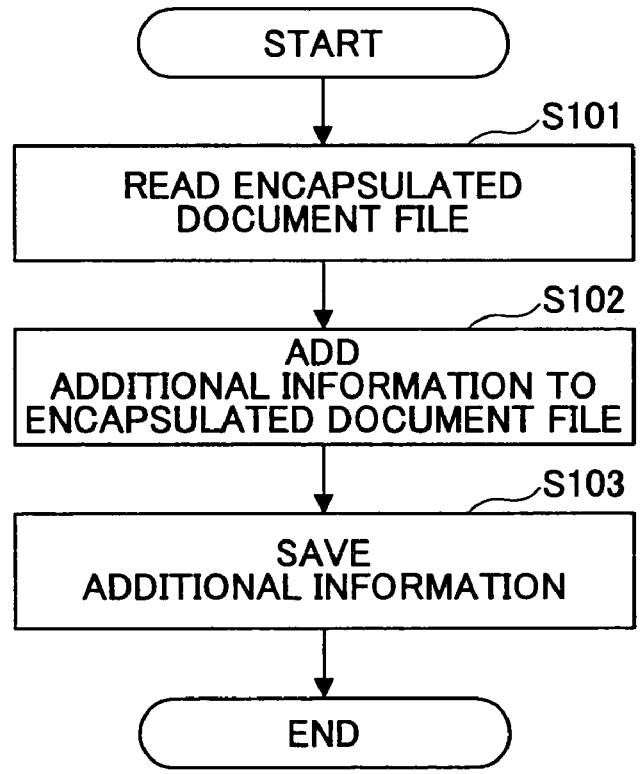
FIG. 37 is a flowchart illustrating an operation for adding information to an encapsulated document file.

The following describes an update operation of multimedia information to which annotation information is added. For example, a document creator creates a document 200 (FIG. 35) using the GUI (FIG. 32) and distributes it as the encapsulated document file 100. If a reader reading the distributed encapsulated document file 100 wants to add additional information 201 (FIG. 36) to the encapsulated document file 100, additional information 201 is added by taking the steps of reading the encapsulated document file 100 (step S101), adding the additional information to the encapsulated document file 100 (step S102), and saving the additional information (step S103) as shown in the flowchart of FIG. 37.

Figure 38:
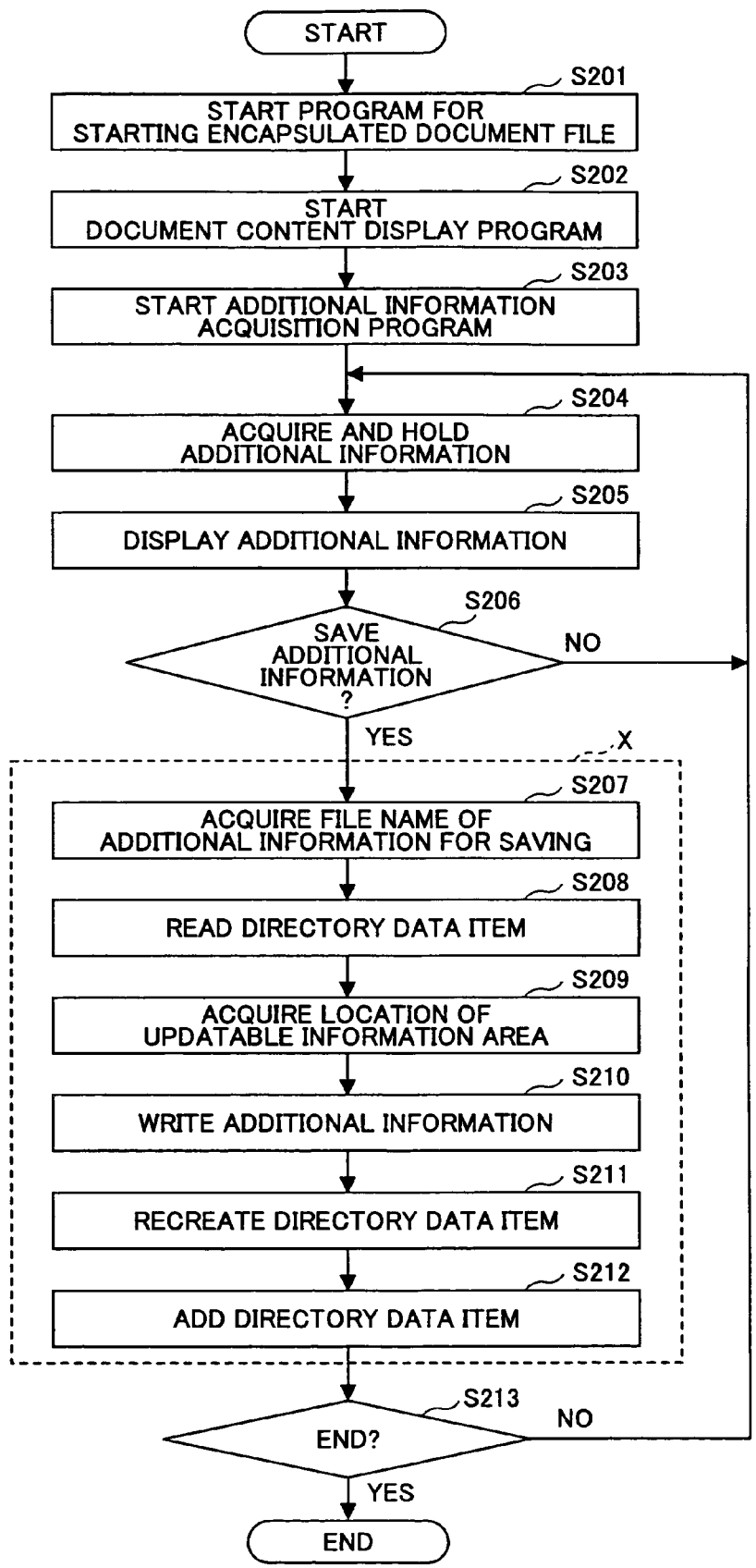
FIG. 38 is a flowchart illustrating an operation for adding information to an encapsulated document file in greater detail.
Figure 39:
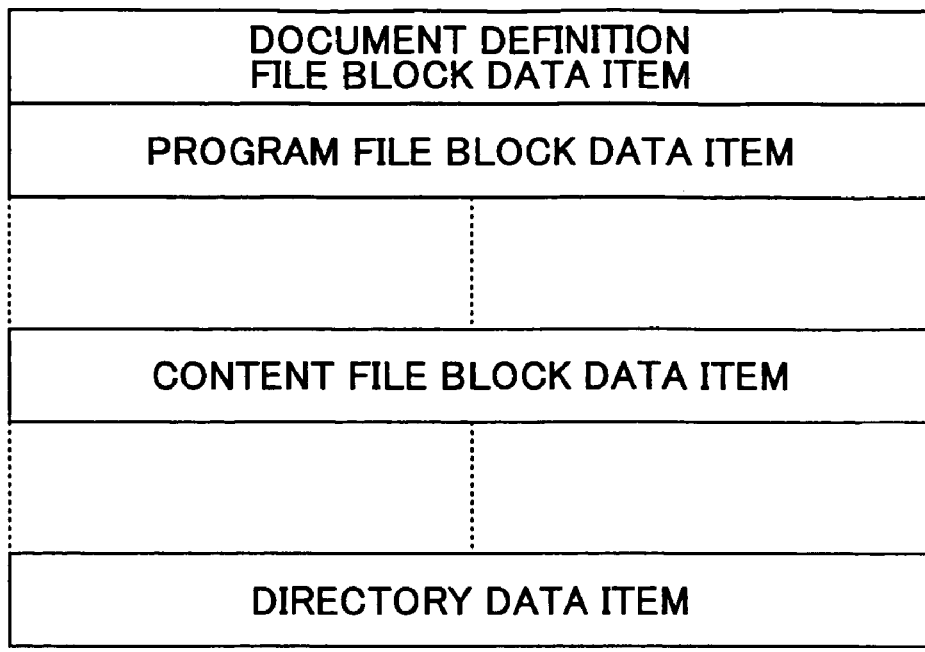
FIG. 39 is a schematic diagram illustrating a structure of an encapsulated document file in an archive file format.
Figure 40:
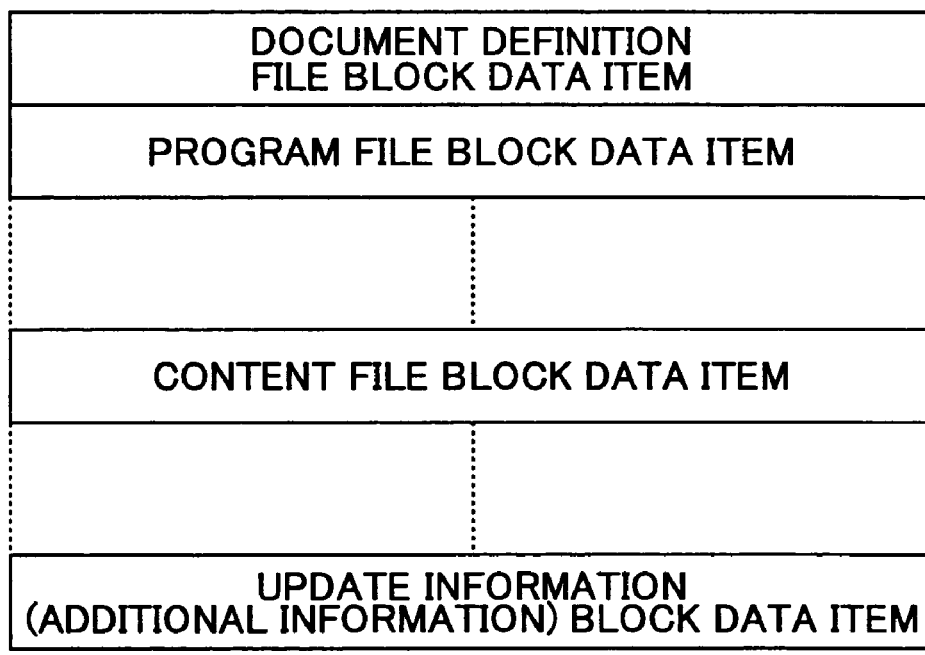
FIG. 40 is a schematic diagram illustrating a structure of an encapsulated document file in an archive file format to which an update information block data item holding update information is added.
Figure 41:
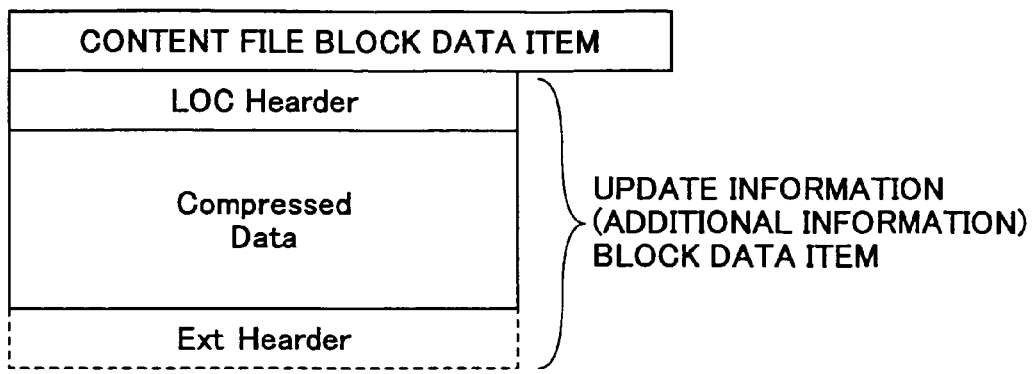
FIG. 41 illustrates an update information block data item.

The add operation (update operation) for adding the additional information to the encapsulated document file 100 is describe in detail with reference to FIG. 38. The update operation described herein corresponds to the update operation described in the first embodiment.

An encapsulated document starting program is started (step S201) so as to read the encapsulated document file 100. One of the program files 103 (document content display program) contained in the encapsulated document file 100 is started (step S202: reading part) so as to display information held in the content file 102 contained in the encapsulated document file 100 of FIG. 35 on a screen of the display unit 9 of the computer 1.

Then, another one of the program files 103 (additional information acquisition program) for acquiring additional information input by a user through the mouse 11 or the like (step S203) is started in order to acquire the additional information input by the user through the mouse 11 or the like.

Although not illustrated, examples provided in Patent Document 1 are applicable as the program file 103 (document content display program, additional information acquisition program, etc.).

Subsequently, the additional information input by the user is acquired and held in the RAM 4 (step S204: first updating part). The held additional information 201 is displayed by the document content display program (see FIG. 36) (step S205).

In step S206, it is determined whether to save the additional information. The determination whether to save the additional information is made by detecting whether a save instruction is issued by the user.

If the save instruction is not issued by the user and therefore the additional information does not need to be saved (step S206: No), the operations in step S204 and 205 for acquiring, holding, and displaying additional information are repeated.

If, otherwise, the save instruction is issued by the user and therefore the additional information needs to be saved (step S206: Yes), a file name of the additional information for saving the additional information into the encapsulated document file 100 is acquired (step S207). The additional information file name may be defined in the document definition file 101 in advance, or may be embedded in a program controlling the save operation of the additional information.

Then, a directory data item of the encapsulated document file 100 is read (step S208), and a location of an updatable information area is acquired (step S209: update instructing part). If the additional information is saved in the encapsulated file for the first time, update information is not held in the encapsulated document file 100 (see FIG. 39). Therefore, an update information block data item for holding the update information is added below the last block data item (see FIG. 40).

After the location of the updatable information area is acquired, contents of the additional information are written into the updatable information area (added update information block data item) (step S210: first writing part). More specifically, with reference to FIG. 41, the additional information is compressed and written into the update information block data item.

Figure 42:
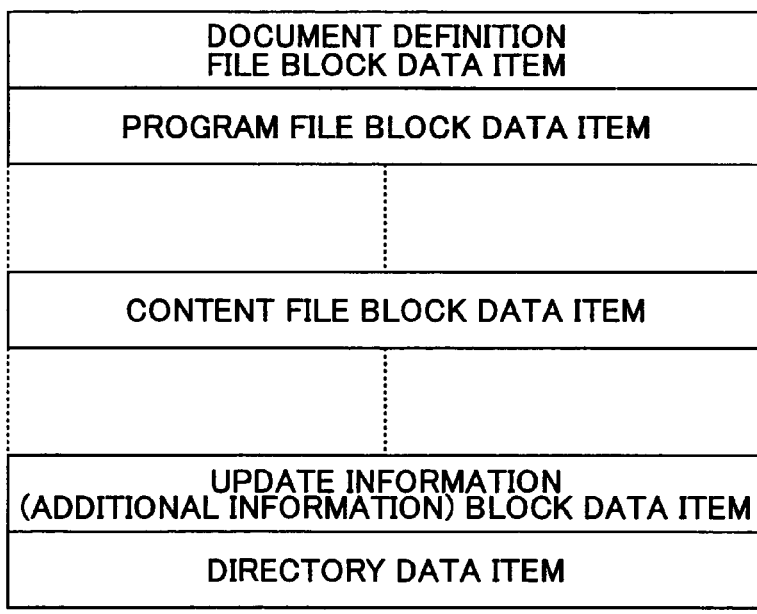
FIG. 42 is a schematic diagram illustrating a structure of an encapsulated document file to which a recreated directory data item is added.
Figure 43:
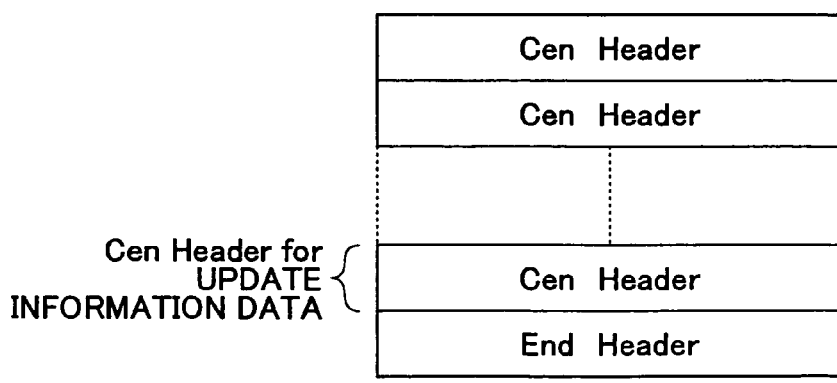
FIG. 43 illustrates a recreated directory data item.

As the update information block data item is added and updated, the directory data item read in the prior step is recreated (step S211: second updating part). The recreated directory data item is added to the encapsulated document file of FIG. 40 (step S212: second writing part). FIG. 42 is a schematic diagram illustrating a structure of the encapsulated document file to which the recreated directory data item is added. More specifically, with reference to FIG. 43, a group of CEN data items, to which a CEN data item corresponding to the added update information block data item is newly added, and the updated END data item are added as the recreated directory data item.

The operations in steps S204 through S212 are repeated until an instruction for ending the additional information add operation is issued by the user.

While the update information block data item is added upon the creation of the update information in this embodiment, a default update information block data item may be added upon the creation of the document in advance so as to be updated together with a corresponding directory data item upon the creation of the update information. In this case, because the size of the update information block data item is changed, the update information block data item and the directory data item need to be rewritten. However, because the sizes of the CEN data item and the END data item (see FIG. 43) do not change, the directory data item can be easily created.

The programs for performing the operations indicated by a dashed-line box X in the flowchart of FIG. 38, i.e., programs for performing operations for adding the additional information to update the encapsulated document file are included in the program files 103 contained in the encapsulated document file 100. Therefore, the encapsulated document file 100 can perform read/display operations, and additional information acquisition/save operations on its own. That is, the encapsulated document file 100 itself offers read and update functions.

It should be understood that the present invention is not limited to the specifically disclosed embodiment, and variations and modifications may be made without departing from the scope of the present invention.

The present application is based on

Japanese Priority Application No. 2004-212848 filed on Jul. 21, 2004, and Japanese Priority Application No. 2005-152743 filed on May 25, 2005, with the Japanese Patent Office, the entire contents of which are hereby incorporated by reference.

What is claimed is:

1. A computer implemented information processing apparatus including a processor that processes an archive file in a compressed archive file format in which one or more files converted into block data items are merged into a single file, comprising:

an update instructing part configured to issue an update instruction to modify a desired block data item of the block data items contained in the archive file;

an information protecting part configured to protect a predetermined data item contained in the archive file by moving the predetermined data into a temporary storage according to the update instruction from the update instructing part, the predetermined data item being a block data item of block data items not to be modified;

a reading part configured to decompress the desired block data item contained in the archive file specified by the update instructing part to enable reading of a content of an original file corresponding to the desired block data item;

an archive locking part configured to lock the block data items not to be modified contained in the archive file such that the block data items not to be modified remain compressed when the desired block data item contained in the archive file is decompressed by the reading part;

a first updating part configured to update the content of the original file read by the reading part;

a first writing part configured to compress the original file containing the content updated by the first updating part into an updated block data item and to write the updated block data item into the archive file;

a second updating part configured to update a content of the predetermined data item protected by the information protecting part based on the content of the original file updated by the first updating part; and a second writing part configured to write the predetermined data item containing the content updated by the second updating part into the archive file into which the updated block data item is written by the first writing part.

2. The computer implemented information processing apparatus as claimed in claim 1, wherein the information protecting part moves all data items contained in the archive file located below the desired block data item contained in the archive file specified by the update instructing part into a temporary storage part and updates a content of an attribute data item contained in the moved data items.

3. The computer implemented information processing apparatus as claimed in claim 1, wherein the information protecting part moves an attribute data item contained in the archive file specified by the update instructing part into a temporary storage part and updates a content of the moved attribute data item.

4. The computer implemented information processing apparatus as claimed in claim 3, wherein the attribute data item moved by the information protecting part includes information indicating a start address of each of the block data items contained in the archive file.

5. The computer implemented information processing apparatus as claimed in claim 3, wherein the information protecting part compares a size of the desired block data item before the content update by the first updating part and the size of the desired block data item after the content update by the first updating part, and moves the attribute data item contained in the archive file specified by the update instructing part into the temporary storage part if the size of the block data item after the content update by the first updating part is greater than the size before the content update.

6. The computer implemented information processing apparatus as claimed in claim 3, wherein the information protecting part reads the desired block data item to be overwritten when the first updating part updates the content of the original file, and moves the attribute data item contained in the archive file specified by the update instructing part into the temporary storage part if signature information as an identification of a subsequent block data item is detected.

7. The computer implemented information processing apparatus as claimed in claim 1, wherein the information protecting part separates the archive file at a location of the desired block data item contained in the archive file specified by the update instructing part into a first archive file containing the desired block data item and a second archive file not containing the desired block data item, and updates a content of an attribute data item contained in the second archive file.

8. The computer implemented information processing apparatus as claimed in claim 2, wherein the reading part determines whether the archive file format of the archive file is destroyed, and reads a block data item or the attribute data item moved into the temporary storage part by the information protecting part instead of reading the block data item or an attribute data item contained in the archive file if the reading part determines that the archive file format is destroyed.

9. The computer implemented information processing apparatus as claimed in claim 7, wherein the reading part determines whether the archive file format of the archive file is destroyed, and reads a block data item or the attribute data item contained in the second archive file instead of reading the block data item or an attribute data item contained in the first archive file if the reading part determines that the archive file format is destroyed.

10. The computer implemented information processing apparatus as claimed in claim 8, wherein if an attribute data item of an update execution flag is included in an END data item contained in the archive file, the reading part determines whether the archive file format of the archive file is destroyed based on a flag value of the update execution flag.

11. The computer implemented information processing apparatus as claimed in claim 8, wherein the reading part determines whether the archive file format of the archive file is destroyed based on data contained in an END data item that indicate a storage location of a top CEN data item.

12. The computer implemented information processing apparatus as claimed in claim 1, wherein when the reading part reads the desired block data item of which content is to be updated by the first updating part, the reading part suspends the read operation until the first updating part completes updating the content of the original file of the desired block data item.

13. The computer implemented information processing apparatus as claimed in claim 1, wherein the archive file includes an encapsulated document in which a content file to represent the content of a document, a definition file to describe the definition for the document, and a program file to make the content file operable are archived into the single file.

14. A computer readable recording medium having a program embodied therein for processing an archive file in a compressed archive file format in which one or more files converted into block data items are merged into a single file, said program including computer-executable instructions for executing a method comprising:
   issuing an update instruction to modify a desired block data item of the block data items contained in the archive file;
   protecting a predetermined data item contained in the archive file by moving the predetermined data into a temporary storage according to the update instruction from the update instructing function, the predetermined data item being a block data item of block data items not to be modified;
   decompressing the desired block data item contained in the archive file specified by the update instructing function to enable reading of a content of an original file corresponding to the desired block data item;
   locking the block data items not to be modified contained in the archive file such that the block data items not to be modified remain compressed when the desired block data item contained in the archive file is decompressed by the decompressing;
   updating the content of the original file read by the reading function;
   compressing the original file containing the content updated by the first updating function into an updated block data item and writing the updated block data item into the archive file;
   updating a content of the predetermined data item protected by the information protecting function based on the content of the original file updated by the first updating function; and
   writing the predetermined data item containing the content updated by the second updating function into the archive file into which the updated block data item is written by the first writing function.

15. The computer readable recording medium as claimed in claim 14, wherein the information protecting function moves all data items contained in the archive file located below the desired block data item contained in the archive file specified by the update instructing function into a temporary storage part and updates a content of an attribute data item contained in the moved data items.

16. The computer readable recording medium as claimed in claim 14, wherein the information protecting function moves an attribute data item contained in the archive file specified by the update instructing function into a temporary storage part and updates a content of the moved attribute data item.

17. The computer readable recording medium as claimed in claim 16, wherein the attribute data item moved by the information protecting function includes information indicating a start address of each of the block data items contained in the archive file.

18. The computer readable recording medium as claimed in claim 16, wherein the information protecting function compares a size of the desired block data item before the content update by the first updating function and the size of the desired block data item after the content update by the first updating function, and moves the attribute data item contained in the archive file specified by the update instructing function into the temporary storage part if the size of the block data item after the content update by the first updating function is greater than the size before the content update.

19. The computer readable recording medium as claimed in claim 16, wherein the information protecting function reads the desired block data item to be overwritten when the first updating function updates the content of the original file, and moves the attribute data item contained in the archive file specified by the update instructing part into the temporary storage part if signature information as an identification of a subsequent block data item is detected.

20. The computer readable recording medium as claimed in claim 14, wherein the information protecting function separates the archive file at a location of the desired block data item contained in the archive file specified by the update instructing function into a first archive file containing the desired block data item and a second archive file not containing the desired block data item, and updates a content of an attribute data item contained in the second archive file.

21. The computer readable recording medium as claimed in claim 15, wherein the reading function determines whether the archive file format of the archive file is destroyed, and reads a block data item or the attribute data item moved into the temporary storage part by the information protecting function instead of reading the block data item or an attribute data item contained in the archive file if the reading function determines that the archive file format is destroyed.

22. The computer readable recording medium as claimed in claim 20, wherein the reading function determines whether the archive file format of the archive file is destroyed, and reads a block data item or the attribute data item contained in the second archive file instead of reading the block data item or an attribute data item contained in the first archive file if the reading function determines that the archive file format is destroyed.

23. The computer readable recording medium as claimed in claim 21, wherein if an attribute data item of an update execution flag is included in an END data item contained in the archive file, the reading function determines whether the archive file format of the archive file is destroyed based on a flag value of the update execution flag.

24. The computer readable recording medium as claimed in claim 21, wherein the reading function determines whether the archive file format of the archive file is destroyed based on data contained in an END data item that indicate a storage location of a top CEN data item.

25. The computer readable recording medium as claimed in claim 14, wherein when the reading function reads the desired block data item of which content is to be updated by the first updating function, the reading function suspends the read operation until the first updating function completes updating the content of the original file of the desired block data item.

* * * * *